US008862988B2

(12) United States Patent
Baker et al.

(10) Patent No.: US 8,862,988 B2
(45) Date of Patent: Oct. 14, 2014

(54) PICTORIAL KEYBOARD WITH POLYSEMOUS KEYS FOR CHINESE CHARACTER OUTPUT

(75) Inventors: Bruce R. Baker, Pittsburgh, PA (US); Tianxue Yao, Pittsburgh, PA (US); Paul Andres, Springe (DE); Jutta Hermann, Pittsburgh, PA (US); Sarah Miriam Yong, Singapore (SG); Zen Koh, Singapore (SG); Eric Nyberg, Pittsburgh, PA (US); Katharine J. Hill, Pittsburgh, PA (US); Mark A. Zucco, Pittsburgh, PA (US)

(73) Assignee: Semantic Compaction Systems, Inc., Pittsburgh, PA (US)

( * ) Notice: Subject to any disclaimer, the term of this patent is extended or adjusted under 35 U.S.C. 154(b) by 1276 days.

(21) Appl. No.: 12/000,707

(22) Filed: Dec. 17, 2007

(65) Prior Publication Data

US 2008/0183460 A1    Jul. 31, 2008

Related U.S. Application Data

(60) Provisional application No. 60/875,360, filed on Dec. 18, 2006.

(51) Int. Cl.
*G06F 3/00*     (2006.01)
(52) U.S. Cl.
USPC .......................................................... 715/262
(58) Field of Classification Search
USPC ................ 715/261, 262, 263, 264, 265, 773; 345/171, 172
See application file for complete search history.

(56) References Cited

U.S. PATENT DOCUMENTS 4,498,143 A * 2/1985 Strzelecki ...................... 715/263
4,559,615 A * 12/1985 Goo et al. ....................... 715/263
(Continued)

FOREIGN PATENT DOCUMENTS

WO    WO 98/20429    5/1998

OTHER PUBLICATIONS

International Search Report and Written Opinion of the International Searching Authority (dated Jun. 5, 2008).

(Continued)

*Primary Examiner* — Kyle Stork
(74) *Attorney, Agent, or Firm* — Harness, Dickey & Pierce, P.L.C.

(57) ABSTRACT

An apparatus, method and computer readable medium are disclosed. In at least one embodiment, the apparatus includes a keyboard including keys, a plurality of the keys each being associated with a polysemous symbol relating to a concept represented by a Chinese radical; and a processor, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character. A plurality of the keys may include each of a polysemous symbol, a Chinese radical, a Chinese measure word character and a Pinyin/Bopomofo letter, each associated with one another.

170 Claims, 19 Drawing Sheets

(56) References Cited

U.S. PATENT DOCUMENTS

| | | | | |
|---|---|---|---|---|
| 4,661,916 | A * | 4/1987 | Baker et al. | 704/260 |
| 4,669,901 | A * | 6/1987 | Feng | 400/484 |
| 4,920,492 | A * | 4/1990 | Wang | 715/262 |
| 4,940,346 | A * | 7/1990 | Liljenquist | 400/487 |
| 4,949,260 | A * | 8/1990 | Hsu | 715/264 |
| 4,951,202 | A * | 8/1990 | Yan | 715/259 |
| 5,119,296 | A * | 6/1992 | Zheng et al. | 715/263 |
| 5,197,810 | A * | 3/1993 | Zhang et al. | 400/110 |
| 5,486,112 | A * | 1/1996 | Troudet et al. | 434/250 |
| 5,507,649 | A * | 4/1996 | Troudet | 434/233 |
| 6,460,103 | B1 | 10/2002 | Powers et al. | |
| 6,604,878 | B1 | 8/2003 | Wong | |
| 7,301,532 | B1 * | 11/2007 | Dobry | 345/172 |
| 2003/0138145 | A1 * | 7/2003 | Sugano | 382/185 |
| 2003/0161672 | A1 * | 8/2003 | Roberson | 400/490 |
| 2004/0193398 | A1 | 9/2004 | Chu et al. | |
| 2004/0243746 | A1 * | 12/2004 | Wong | 710/72 |
| 2005/0186006 | A1 * | 8/2005 | Roberson | 400/492 |
| 2006/0148520 | A1 | 7/2006 | Baker et al. | |

OTHER PUBLICATIONS

Taiwanese Office Action and English translation thereof dated Oct. 22, 2013.

Chang, S.K. et al., "A methodology and interactive environment for iconic language design," International Journal of Human-Computer Studies, vol. 41, No. 5, pp. 683-715, Nov. 1, 1994.

Andres, P., "Developing Appropriate Icon Set Mandarin Chinese Augmentative Communication System," International Journal of Computer Processing of Languages, World Scientific, vol. 19, No. 4, Dec. 19, 2006.

Andres, P., "Developing Appropriate Icon Set Mandarin Chinese Augmentative Communication System," Abstract, International Journal of Computer Processing of Languages, World Scientific, vol. 19, No. 4, Dec. 17, 2006.

The 21$^{st}$ International Conference on Computer Processing of Oriental Languages, Itinerary for conference from Dec. 17-19, 2006.

European Search Report dated Dec. 12, 2012.

European Office Action mailed Jun. 4, 2014.

\* cited by examiner

一辆汽车 = yi1　liang4　qi4che1 = a car

一把刀 = yi1 ba3 dao1 = a knife

一把伞 =  yi1 ba3 san3 = a umbrella

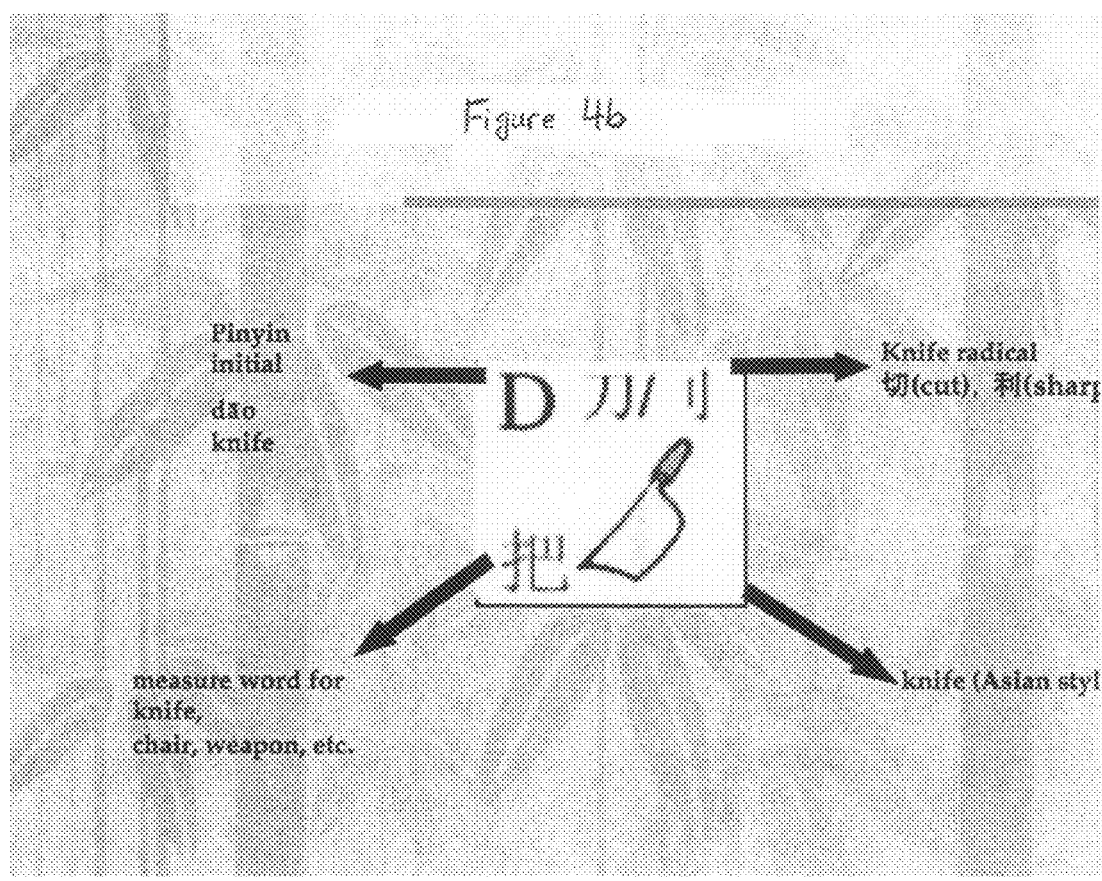

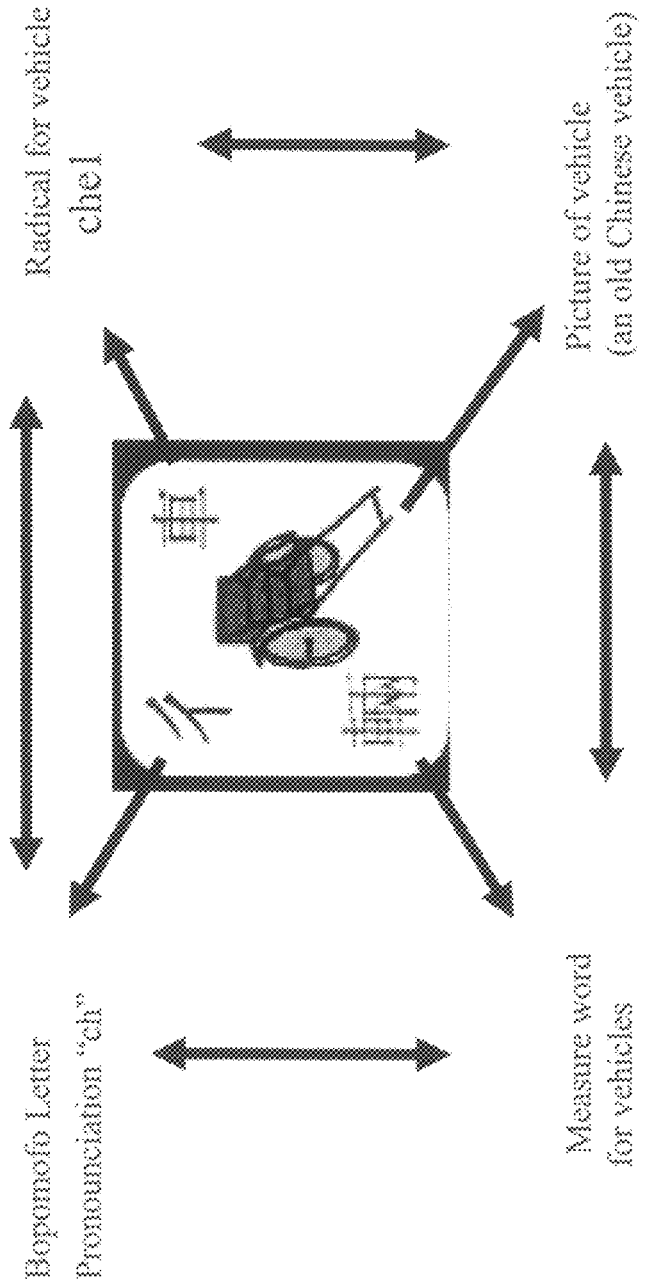

PICTORIAL KEYBOARD WITH POLYSEMOUS KEYS FOR CHINESE CHARACTER OUTPUT

PRIORITY STATEMENT

The present application hereby claims priority under 35 U.S.C. §119(e) on U.S. Patent Application No. 60/875,360 filed Dec. 18, 2006, the entire contents of each of which is hereby incorporated herein by reference.

FIELD

The present application is generally directed to at least one of an apparatus, method and computer readable medium for Chinese character output and selection.

BACKGROUND

In the past, Chinese characters (Hanzi) were written by hand, wherein metal plates were formed and documents were printed using a mimeographing process. Thereafter, Chinese typewriters were developed, including many, many Chinese radicals. However, the arrangement of these radicals was not organized and, importantly, radicals were very difficult to locate among the many, many radicals included.

In addition, even if a radical were located, multiple radicals still had to be located to form a single character or Hanzi. Thus, typing using such a typewriter was very difficult, time consuming and cumbersome. There are 214 Chinese radicals, but fewer than 100 of them are common. Thus, a keyboard including Chinese radicals can be quite complex and the radicals can be quite difficult to locate. These radicals are used for assembling Chinese characters and arranging them in dictionaries, similar to arrange words alphabetically.

A Chinese (Mandarin Chinese (MC)) dictionary is typically organized around the aforementioned Chinese radicals. Every Hanzi includes at least one radical. Most Hanzi are a combination of two elements—a radical and a secondary component. The secondary component usually represents a phonetic element—a kind of "sounds like." First you look up the radical, then count the number of strokes used in the radical for the secondary component of the Hanzi. For example, if the radical includes seven strokes—the word will be in the dictionary among the seven stroke Hanzi with that radical. This is how the system actually works. Thus, typing in Chinese characters is through the use of Chinese radicals can be very tedious and cumbersome.

In China today, some people type messages/words/etc. using Roman letters instead of Chinese radicals. This system used in China is called Pinyin and features Roman letters for vowels and consonants and further includes the use of numbers for pitch. A typical Pinyin word has both a string of letters and a number. An article, entitled "Pinyin versus Radicals for the Chinese Typewriter" to Rodrick S. Bucknell discusses some advantages of using a Pinyin typewriter over one including radicals.

A word prediction-like process typically occurs in the background on a screen on which the words are typed. The word processor suggests or predicts various candidate Chinese characters called "Hanzi" based upon keys selected and input. A person keeps typing until the correct Hanzi appears via prediction. The screen typically displays a series of Hanzi. Such a system can be slow and requires many key inputs to generate a single Chinese character.

SUMMARY

The inventors of the present application discovered that a more effective way to type and otherwise select and output Chinese characters is desired. In at least one embodiment, symbols are used to represent Chinese radicals to enable a user to much easier locate and combine symbols to access Chinese characters or Hanzi. For example, in at least one embodiment, keys of a keyboard are associated with symbols which may include pictures (such as that of a monkey, for example). The symbols may then be polysemous and, when combined with other symbols, can be used to access many different Hanzi in different combinations.

Further, the symbols can be organized in a fashion to make them easy to locate and remember. For example, the polysemous icons may be arranged on the keyboard 200 such that the initial letter of each icon's name (in Pinyin spelling for example) corresponds to a letter on the international QWERTY keyboard layout. As such, symbols associated with radicals may be much easier for a user to locate, as compared with traditional Chinese keyboards.

At least one embodiment of the present invention provides a Chinese (Mandarin Chinese or MC) language system (for word processing, speech processing, etc.) that requires fewer keystrokes than current systems based solely on Hanzi characters, Pinyin, or Bopomofo. The system of at least one embodiment simultaneously reduces the number of keystrokes to represent Chinese language, while at the same time controls the number of symbols in the selection set.

More specifically, the system of at least one embodiment of the present invention was designed for able-bodied and/or physical disabled people who need or want to be able to generate Chinese/MC text and/or voice output with fewer key selections, and in a more intuitive way than using current available technology. In at least one embodiment of the present application, the system includes a well-designed keyboard, or overlay, for access to stored language (Chinese characters). The design of this overlay may include several icons, including grammar representation, polysemous (multi-meaning) icons, and culture-specific revisions.

An apparatus of at least one embodiment of the present application includes a keyboard including keys, a plurality of the keys each being associated with a polysemous symbol relating to a concept represented by a Chinese radical; and a processor, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character.

An apparatus of at least one embodiment of the present application includes an integrated input and display device to display a keyboard including virtual keys, a plurality of the virtual keys including a polysemous symbol and an associated Chinese radical, and to input a corresponding polysemous symbol upon selection of a virtual key; a memory to store a plurality of symbol sequences, each associated with at least one Chinese character; and a processor to compare a sequence of symbols corresponding to sequentially selected virtual keys, in response to each virtual key selection, to the plurality of stored symbol sequences, the integrated input and display being useable to display the at least one associated Chinese character upon the processor determining a match between the sequence of symbols corresponding to sequentially selected virtual keys and one of the plurality of stored symbol sequences.

An apparatus of at least one embodiment of the present application includes means for receiving an indication of selection of a plurality of polysemous symbols, each relating to a concept represented by a Chinese radical; means for determining whether or not the plurality of selected symbols correspond to a sequence of symbols associated with at least one Chinese character; and means for outputting, in response to determining that the plurality of selected symbols correspond to a sequence of symbols associated with at least one Chinese character, the at least one Chinese character.

An apparatus of at least one embodiment of the present application includes a keyboard including keys, a plurality of the keys each being associated with at least two polysemous symbols; and a processor, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character.

An apparatus of at least one embodiment of the present application includes a keyboard including keys, a plurality of the keys each being associated with a polysemous symbol and a Chinese measure word, the Chinese measure word associated with a key providing an indication of symbols sequenceable with the polysemous symbol associated with the key; and a processor, to, in response to determining that a plurality of selected symbols form a sequence of symbols associated with at least one Chinese character, instruct output of the at least one Chinese character.

A method of at least one embodiment of the present application includes receiving an indication of selection of a plurality of polysemous symbols, each relating to a concept represented by a Chinese radical; determining whether or not the plurality of selected symbols correspond to a sequence of symbols associated with at least one Chinese character; and outputting, in response to determining that the plurality of selected symbols correspond to a sequence of symbols associated with at least one Chinese character, the at least one Chinese character.

A method of at least one embodiment of the present application includes receiving an indication of selection of a plurality of keys, each being associated with at least two polysemous symbols; determining whether or not one symbol, of the two polysemous symbols associated with each selected key, when sequenced for each of the selected keys, correspond to a sequence of symbols associated with at least one Chinese character; and outputting, in response to determining that the plurality of selected keys include a sequence of symbols associated with at least one Chinese character, the at least one Chinese character.

A method of at least one embodiment of the present application includes receiving an indication of selection of a plurality of keys of a keyboard, a plurality of the keys being associated with a polysemous symbol and a Chinese measure word, the Chinese measure word associated with a key providing an indication of other symbols sequenceable with the polysemous symbol associated with the key; determining whether or not the plurality of selected symbols correspond to a sequence of symbols associated with at least one Chinese character; and outputting, in response to determining that the plurality of selected symbols correspond to a sequence of symbols associated with at least one Chinese character, the at least one Chinese character.

A computer readable medium of at least one embodiment of the present application includes a first code segment for causing the computer to receive selection of a plurality of polysemous symbols, each relating to a concept represented by a Chinese radical; a second code segment for causing the computer to determine whether or not the plurality of selected symbols correspond to a sequence of symbols associated with at least one Chinese character; and a third code segment for causing the computer to output, in response to determining that the plurality of selected symbols correspond to a sequence of symbols associated with at least one Chinese character, the at least one Chinese character.

BRIEF DESCRIPTION OF THE DRAWINGS

The present application will be described in more detail below by using example embodiments, which will be explained with the aid of the drawings, in which:

FIG. 4b illustrates an example key configuration of a keyboard of the first example embodiment of the present application;

FIG. 6 illustrates an example key configuration of a keyboard of the second example embodiment of the present application.

DETAILED DESCRIPTION OF THE EXAMPLE EMBODIMENTS

Figure 1:
FIG. 1 illustrates pictorial representations of Chinese radical concepts.

In at least one embodiment of the present application, symbols are associated with keys on a keyboard, symbols richly associated with Chinese radicals, to enable a user to locate and combine symbols in an efficient manner to access Chinese characters or Hanzi. As such, a more effective keyboard to type and otherwise select and output Chinese characters may be created. For example, in at least one embodiment, keys of a keyboard are associated with symbols which may include pictures (such as that of a monkey, for example). The symbols may then be polysemous and, when combined with other symbols, can be used to access different Hanzi in different symbol combinations.

Further, the symbols can be organized in a fashion to make them easy to locate and remember. For example, the polysemous icons may be arranged on the keyboard 200 such that the initial letter of each icon's name (in Pinyin spelling for example) corresponds to a letter on the international QWERTY keyboard layout. As such, symbols associated with radicals may be much easier for a user to locate, as compared with traditional Chinese keyboards.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

An apparatus of a first embodiment of the present application includes a keyboard 200 including keys, a plurality of the keys each being associated with a polysemous symbol relating to a concept represented by a Chinese radical; and a processor 4, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character. Such a system may include, for example, a memory 6 to store the plurality of symbol sequences, each in association with at least one Chinese character, wherein the memory 6 may be used to store, in a database, the plurality of symbol sequences, each associated with at least one Chinese character.

A method of a first embodiment of the present application includes receiving an indication of selection of a plurality of polysemous symbols, each relating to a concept represented by a Chinese radical; determining whether or not the plurality of selected symbols correspond to a sequence of symbols associated with at least one Chinese character; and outputting, in response to determining that the plurality of selected symbols correspond to a sequence of symbols associated with at least one Chinese character, the at least one Chinese character. Such a method may include storing, in a database, the plurality of symbol sequences, each associated with at least one Chinese character.

The challenge of any communication system using semantic compaction techniques (including the use of sequenced polysemous symbols to access words, messages, phrases) is to select icons (symbols) which, among other things, reflect the culture so as to lend themselves to encoding with self-explanatory or easily learnable rationales and mnemonics. Because of the physical space constraints of the keyboard, and the need to devote a portion of keys to control functions and grammar labels, the keyboards are also limited for the encoding of semantic information. Through the systematic use of secondary iconicity, these limitations can be overcome. A well-designed semantic compaction keyboard offers an ample supply of what might be termed "semantic space".

Experience has shown that there is a definite advantage in working with this reduced icon set, because it is a further factor in improving automaticity. In western languages this number of semantic icons (if well-chosen) has proven sufficient to encode all necessary vocabulary into a system.

Within written Mandarin Chinese, there is a set of 214 'radical' ideograms which can be used to categorize Chinese characters. Each Chinese character contains at least one of these radicals (or a modified radical), which often bears some relation to the character's meaning. A system offering all of these radicals and their modifiers on individual keys is impractical, as it would require more keys than would be practical to use. Nevertheless, these radicals have the potential to bring written Chinese characters and semantic compaction together.

Each radical is itself based on an ancient drawing and generally represents, at the simplest level, common objects (e.g. knife, rice, dog), people (e.g. man, father, baby), properties (e.g. big, small) or activities (e.g. walk, run). By selecting a group of these radicals, and using modern graphic interpretations of the basic concepts they depict, enough semantic space is provided on a keyboard 200 of at least one embodiment of the present application to provide a core vocabulary for a user of a word processing or speech processing system. At the same time, by using these familiar Chinese concepts, cultural knowledge of the user can be applied.

Based on a list of the 100 most common radical characters, the 55 most frequently occurring are chosen, in at least one embodiment of the present application. The basic concepts represented by these radicals are listed in Table 1.

TABLE 1

Concepts represented by the 55 most frequently occurring Chinese radicals.

Bamboo
Big
Bird
Cat
Child
City
Cliff
Clothing
Dog
Ear
Earth
Enclosure
Eye
Father
Field
Fire
Fish
Foot
Gate
Gold
Grain TABLE 1-continued Concepts represented by the 55 most frequently occurring Chinese radicals.

Grass
Hand
Heart
Ice
Insect
Jade
Knife
Man
Moon
Mountain
Mouth
Net
Over
Rain
Rice
Roof
Run
See
Shell
Sickness
Silk
Small
Speak
Spirit
Steam
Step
Stone
Sun
Tree
Walk
Water
Wind
Woman
Work In order to establish a selection of icons for the semantic area of the keyboard 200, symbols such as pictorial illustrations for example, are assigned to each concept in the apparatus and method of an embodiment of the present application. Most of the concepts of the Chinese radicals listed (e.g. child, man, dog, walk) are remarkably universal.

In developing a symbol set for the keyboard 200 of an embodiment of the present application, each concept represented by a Chinese radical is first assigned an iconic representation or polysemous symbol. It is important to note that at this stage no vocabulary is yet encoded. This is simply the development of a set of multi-meaning pictures to generate a broad range of associations.

Thus "man", "knife" and "dog" are all picture-producing words and universal concepts. Others such as, "big", "small", "spirit", "gold" or "wind" are not immediately recognizable in a pictorial representation. As representations for these concepts, easily understandable metaphors are created as shown in FIG. 1, e.g. "big" (the "thumbs up" key) or "small" (the "thumbs down" key), or associated objects, e.g. "spirit" (a bell) or "gold" (a coin). Still other concepts present different problems: several of the concepts listed suggested very similar pictures e.g. "walk" (a man walking) and "run" (a man running) or "speak" (a face showing a voice speaking) and "mouth" (a picture of a mouth).

Figure 2:
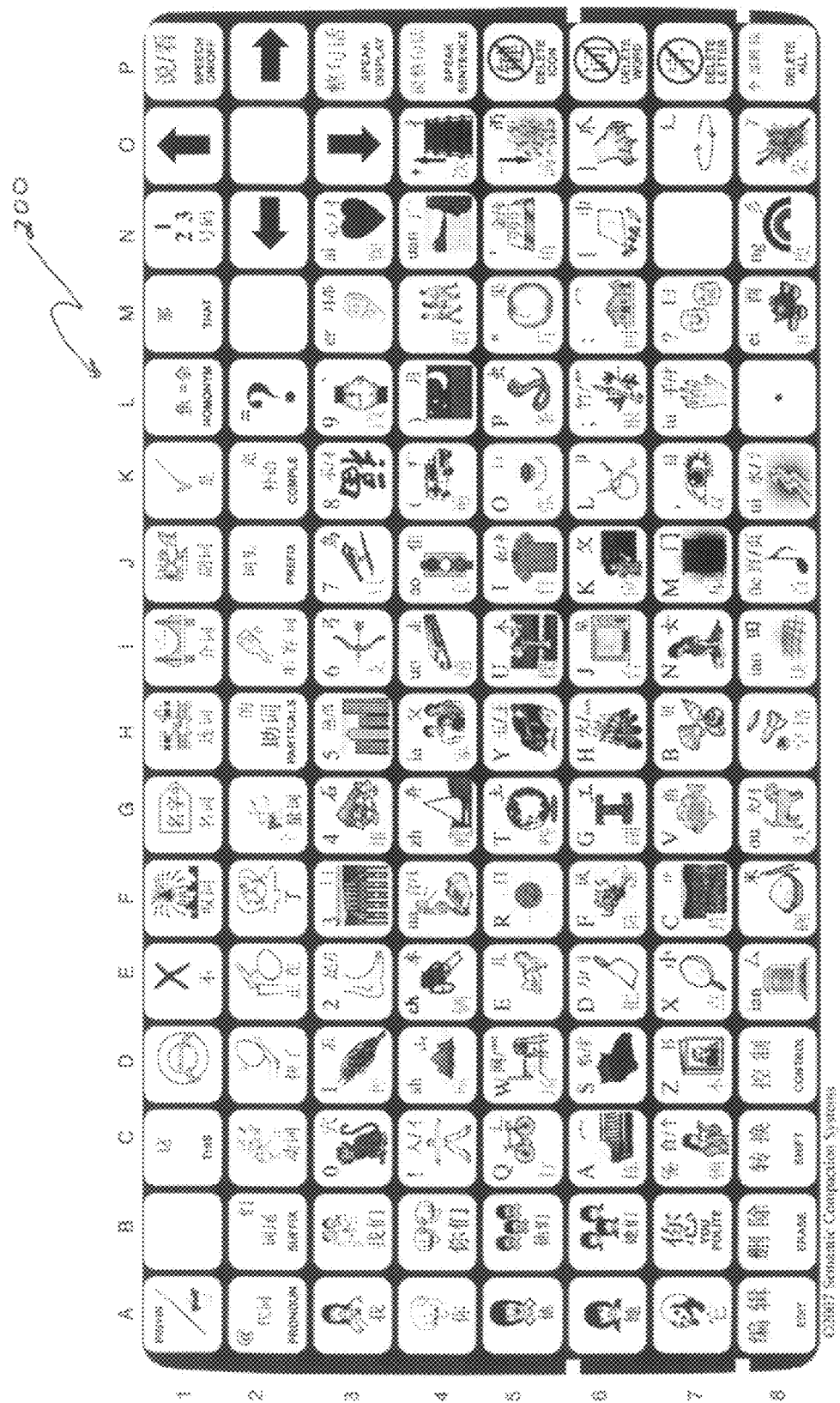
FIG. 2 illustrates a keyboard of a first example embodiment of the present application.

One reason to use multi-meaning icons (polysemous symbols) over single meaning symbols is that similar concepts produce very similar pictures. As a vocabulary with its associated single meaning symbols set grows, it becomes harder and harder to differentiate concepts. At the same time, certain advantageous associations (such as associating concepts with technology) could be difficult to generate from the icons. To offset these problems, several modern representations could be introduced on the keyboard as alternatives and supplements, e.g. "speak" (a picture of a cell phone), "run" (a picture of a car) and "see" (a picture of a television). In this way a set of working icons showing easily recognizable objects, each associated with a Chinese radical is established. The icon set of an example embodiment of a keyboard 200 of the present application is shown in FIG. 2.

In at least one embodiment, the polysemous icons may be arranged on the keyboard 200 such that a key corresponding to an initial letter of a name of a symbol (in Pinyin or Bopomofo spelling for example) corresponds to a key including a Roman letter on an international keyboard layout, such as a QWERTY keyboard layout for example.

Parallel to the development of the multi-meaning icons, preliminary grammar keys based on Chinese parts-of-speech may also be created. Three separate techniques for establishing icons for these groups should be effective in the Chinese system.

In cases where the grammar key contains enough semantic information to suggest a picture, this picture is used. The most obvious group of words in this group are the personal pronouns.

In cases where a metaphor offers an easy mnemonic, e.g. a paintbrush for adjectives, icons can also be easily established.

Finally, if a Chinese (MC) word clearly names a grammatical category, e.g. "question," the character for that name can be used on the location as an icon.

In other cases, the icon is generally given a simple text label.

Establishing which grammatical categories merit individual grammar keys is a matter of language analysis. Typically, only those grammar keys which can expand the vocabulary capacity of the system, or keys which cannot be omitted without creating logical inconsistencies in the system, are used.

Many of the keys combine a polysemous symbol with a Pinyin Roman letter that has the same initial sound as the Roman letter in Pinyin. To this may also be added, the combining of a radical from Mandarin Chinese (MC) that is an expansion of, or related to, the symbol and the sound. Thus, a plurality of keys of the keyboard 200 may be associated with a polysemous symbol relating to a concept represented by a Chinese radical.

Any and all of these in various combinations may prove important to the system of at least one embodiment. These can form the typical keys of a keyboard 200 in the system of an embodiment of the present application and can constitute a very new kind of "associational environment."

Again, the symbols on the keyboard 200 can be organized in a fashion to make them easy to locate and remember. For example, in at least one embodiment, at least some of the symbols may be arranged on the keyboard 200 such that a key corresponding to an initial letter of a name of a symbol, in Pinyin for example, corresponds to a key including a Roman letter on an international keyboard layout. In at least one embodiment, the polysemous icons may be arranged on the keyboard 200 such that the initial letter of each icon's name (in Pinyin spelling for example) corresponds to a letter on an international keyboard layout, such as a QWERTY keyboard layout for example. A somewhat similar strategy can be employed for the Bopomofo example of a second embodiment. As such, symbols associated with radicals may be much easier for a user to locate, as compared with traditional Chinese keyboards.

Thus, in an embodiment of the present application, an apparatus includes a keyboard 200 including keys, a plurality of the keys each being associated with a polysemous symbol relating to a concept represented by a Chinese radical. An example of such a keyboard 200 is shown in FIG. 2 of the present application, wherein a number of the keys of the keyboard 200 are associated with each of a polysemous symbol (center portion of key), a Chinese radical (upper right portion of key) and a Pinyin letter (upper left portion of key). In addition, at least some of the keys are also associated with a Chinese measure word character (lower left portion of the key).

Each of the polysemous symbol, Chinese radical and Pinyin letter on a given key are associated with one another; and each of the polysemous symbol, Chinese radical, Pinyin letter, and Chinese measure word character are associated with one another. Further, it should be noted that the embodiments of the present application are not limited to the example positions of the polysemous symbol, Chinese radical, Pinyin letter, and Chinese measure word character expressed above and shown in FIG. 2, and/or the particular symbols/icons used on the various keys of the keyboard 200. The keys including the polysemous symbols/icons need only include, in at least one embodiment, the polysemous symbol itself, relating to a concept represented by a Chinese radical. Further, as shown in FIG. 2, the symbols can include pictorial illustrations.

Figure 3:
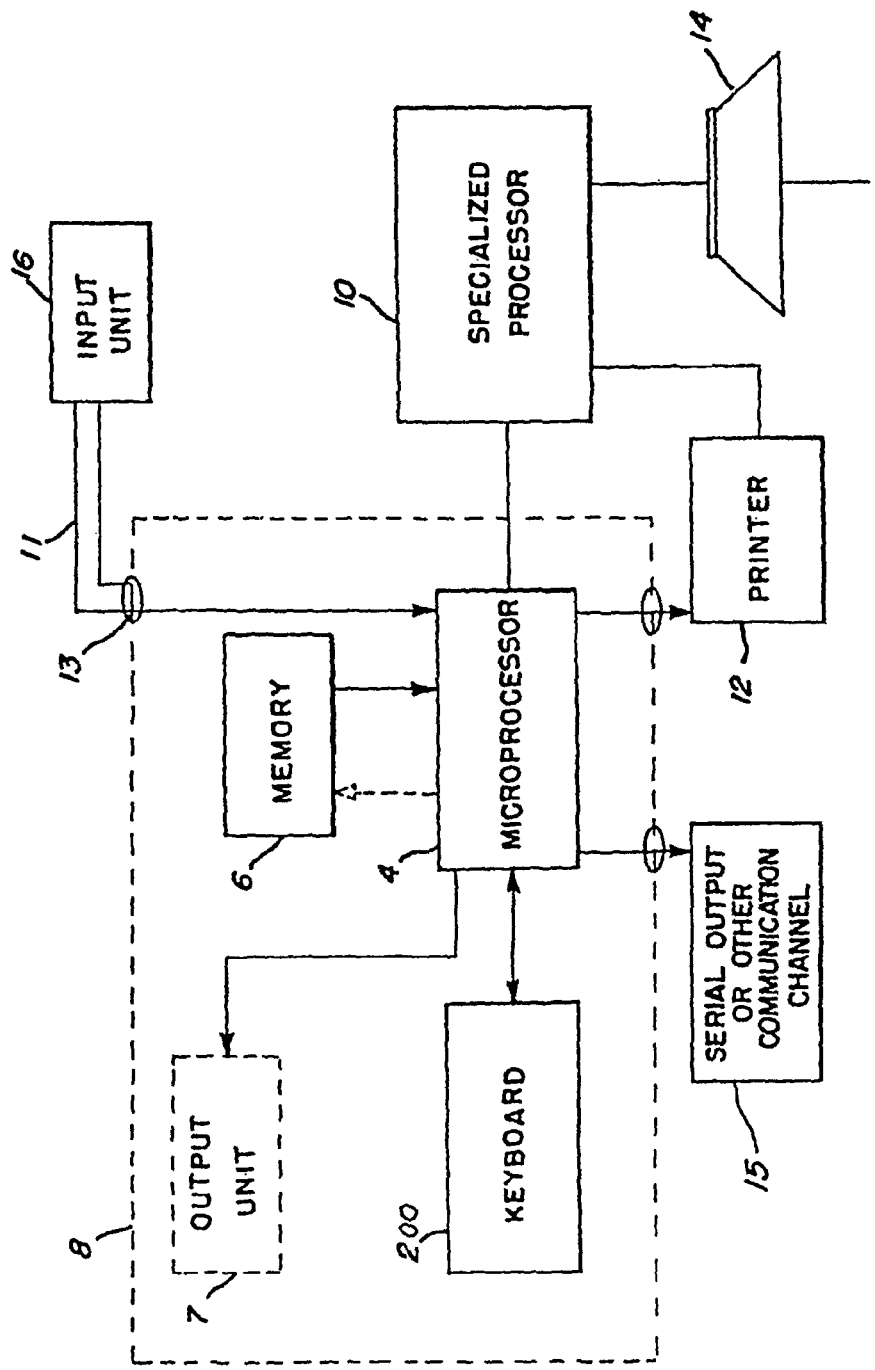
FIG. 3 illustrates an example embodiment of an apparatus of the present application and attached peripheral units.
Figure 3A:
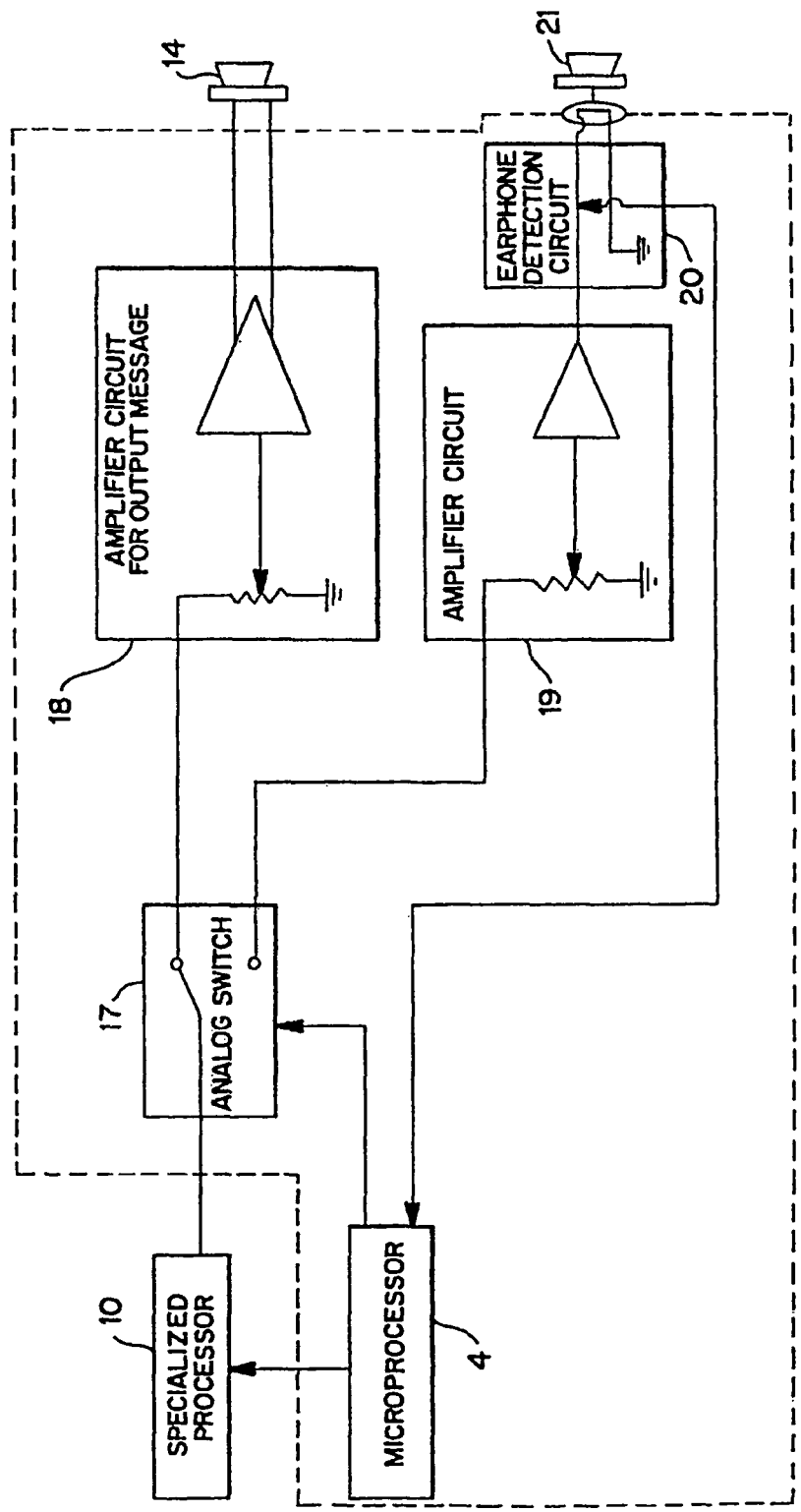
FIG. 3a illustrates further components of an example embodiment of the present application.

Referring to FIGS. 3 and 3a, there is illustrated an apparatus of an embodiment of the present application, generally designated by 8. The apparatus 8 is shown in conjunction with a specialized processor 10 and output unit 7, printer 12, communication channel 15, audio circuits 18 and 19 with speakers 14 and 21. Alternatively, circuit 19 and speaker 21 may be omitted, with audio output routed through circuit 18 to speaker 14 for example. The apparatus 8 may generate input for the processor 10 based on accessing information (e.g. at least one Chinese character) corresponding to polysemous symbol sequences associated with keys on the keyboard 200, for output to the output unit 7 (for display in a word processing mode for example, wherein the apparatus of at least one embodiment of the present application may include a display to display the output at least one Chinese character associated with the sequence of selected symbols) and/or to speaker 14 (in a speech processing mode for example). The apparatus 8 may generate input for the processor 10 based on accessing information corresponding to polysemous symbols of selected keys of the keyboard 200. Alternatively, the specialized processor 10 may be omitted, and the apparatus 8 may output processed information to printer 12, output unit 7, communication channel 15, etc. Any and all of the output channels of apparatus 8 may be selected to output a given at least one Chinese character.

It should be noted that if the output unit 7 includes a display, the keyboard 200 and the display may be integrated. Further, the keyboard 200 may be a virtual keyboard, and again may be integrated with a display.

The addition of auditory scanning capabilities to the apparatus 8, in at least one embodiment, may include that the specialized processor 10 includes a microprocessor controlled speech synthesizer, to synthesize speech for example. The synthesizer should be a high quality synthesizer that is easily understood by the user. Anything less will make the system difficult to learn and use in other than optimal conditions. To maximize the effectiveness of the system, provisions need to be made in the hardware to allow the microprocessor 4 to route the audio signal output from the specialized processor 10 either to the user or the conversation partner. If both the system prompts and user generated speech are sent to the external speaker 14, the conversation partner will have system prompts intended for the user's access requirements.

Thus, in at least one embodiment, a speech synthesis system may include the apparatus 8, as well as a speech synthesizer to synthesize the output at least one Chinese character. Further, in at least one embodiment to be described hereafter, a phono-spell system may include the apparatus 8.

The example implementation of auditory scanning is shown and described regarding FIG. 3a and uses an analog switch 17 to route the output from the speech synthesizer to either the standard audio output circuit 18 to speak to a listener through speaker 14, or to route the audio to the prompt audio output circuit 19 to inform the user of the present state of the apparatus through an earphone or private speaker 21. An earphone detection circuit 20 may also be included in this example. The apparatus 8 can detect if the earphone becomes disconnected and route the auditory scanning prompts to the main speaker if needed to keep the system functional.

As stated above, the apparatus 8 may include an output unit 7. This output unit 7 can be one of a processor and speaker to generate audible sound waves, light source matrix with individually controlled lights, or any similar type output device or combination of devices which can be utilized in conjunction with one of a plurality of different input units 16. The input unit 16 may be one or more of a plurality of input devices (such as those described in U.S. Pat. No. 5,297,041 issued Mar. 22, 1994 to Kushler et. al., the entire contents of which are hereby incorporated herein by reference) which is utilized in conjunction with the output device 7 and the microprocessor 4 to activate signals corresponding to the plurality of keys on the keyboard and thus indicate selection of a particular key. Further, this input device 16 can be connected to the microprocessor 4 through a cable 11 which is attached to an input port 13 of the apparatus 8. Thus, a plurality of various input units 16 may be utilized to effect key selection and activation without depressing a key on the keyboard.

The processor 10 may be a language translator, a voice synthesizer and/or any other similar-type processor which may process Chinese characters, accessed by the apparatus 8. Upon processing of the accessed Chinese characters, the Chinese characters may then be output to an analog switch 17 under the control of microprocessor 4. This circuit can send the audio output-signal of processor 10 to amplifier circuit 18 and then to speaker 14, as shown in FIG. 3a, to output an audible message corresponding to the accessed Chinese characters to communicate the accessed Chinese characters to another person. The specialized processor 10, may be one of a commercially available speech synthesizer such as the Votrax speech SPAC with the SC-01 voice synthesizer chip therein, marketed by Votrax or the commercially available DecTalk or SmoothTalker, for example.

The output of the synthesizer, or a similar specialized processor, may be in turn coupled to a speaker 14 as described above to generate audible synthetic speech in a manner well known in the art. Microprocessor 4 may also use the analog switch 17 to route the audio output signal from microprocessor 10 to amplifier circuit 19 and then to a private listening speaker or earphone 21 used by the operator of apparatus 8 to receive auditory feedback from the system (during auditory scanning, for example). If the earphone detection circuit 20 indicates that no external earphone or speaker is connected, or alternatively, if the entire audio circuit system of 19, 20 and 21 is omitted, this auditory feedback signal can be routed to amplifier 18 and speaker 14. As such, in at least one embodiment of the present application, a speech synthesis system is disclosed, including the apparatus 8 and a speech synthesizer to synthesize the output at least one Chinese character.

In addition, a scanning system as disclosed in U.S. Pat. No. 5,297,041 issued Mar. 22, 1994 to Kushler et. al., the entire contents of which are hereby incorporated herein by reference, may include the apparatus 8 described above. A row-column scanner, as disclosed in U.S. Pat. No. 5,297,041 issued Mar. 22, 1994 to Kushler et. al., may be used to detect selection of a key of the keyboard 200 of FIG. 2. Thus, in at least one embodiment, a scanning system can include the apparatus 8 and a row-column scanner to select a key.

Further, an apparatus 8 (of FIG. 3 for example) of an embodiment of the present application can further include a processor (such as a microprocessor 4 of FIGS. 3 and 3*a* for example), to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output (via output unit 7 of FIG. 3 for example) of the at least one Chinese character.

The apparatus 8 can also include a memory 6, to store the plurality of symbol sequences, each in association with at least one Chinese character. The memory 6 may be used to store the plurality of symbol sequences (in a database for example), each stored in association with at least one Chinese character. In addition, the apparatus 8 may include a display as the output unit 7 for example, to display the output at least one Chinese character associated with the sequence of selected symbols. Each stored symbol sequence may include two or three symbols, for example, each sequence associated with at least one Chinese character. Further, the keyboard 200 may be a virtual keyboard; and the keyboard 200 and display may be integrated.

Figure 3B:
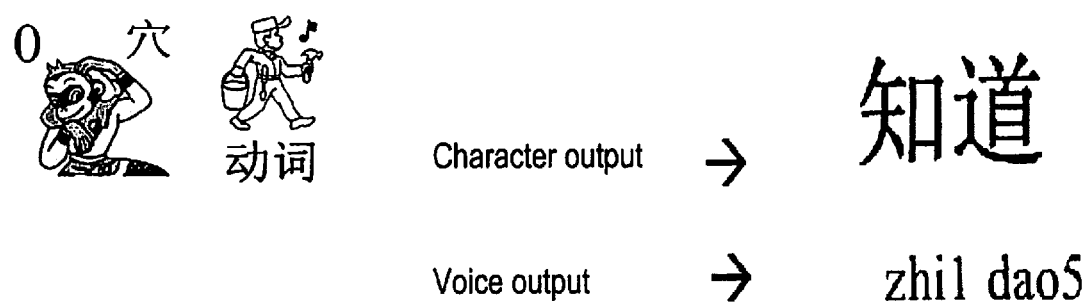
FIG. 3B illustrates one non-limiting example of a two symbol sequence used to access at least one associated Chinese character.

One non-limiting example of a two symbol sequence used to access at least one associated Chinese character is shown in FIG. 3B.

In at least one embodiment as shown in FIG. 3B, the key associated with the "monkey-king" symbol and the key associated with the "action man" symbol are sequentially selected. The processor 4 then compares, for example, this symbol sequence to a plurality of stored symbol sequences in memory 6. This can be done for each sequentially selected key. Upon determining that the symbol sequence is one stored, for example, and/or otherwise associated with at least one Chinese character, then output of the at least one Chinese character is instructed. As indicated FIG. 3B, such an output may include, for example, a display of the at least one Chinese character and/or a voice output (shown in Pinyin, above). Thus, the output can include a speech synthesized output of the associated at least one Chinese character for each selected symbol sequence. It should be noted that the two symbol sequence shown above is merely an example, as symbol sequences for accessing at least one Chinese character can include two, three, four, five, etc. symbol sequences.

In at least one embodiment, the keyboard 200 includes keys, a plurality of the keys each being associated with at least two polysemous symbols. For example, both the polysemous symbol (center of key on keyboard 200 of FIG. 2), as well as the Chinese radical (upper right of key on keyboard 200 of FIG. 2) are each polysemous and a key may be associated with at least two polysemous symbols. A processor 4 (such as a microprocessor 4 of FIGS. 3 and 3*a* for example) can then be used to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character.

Further, in at least one embodiment, the keyboard 200 is integrated with a display to form an integrated input and display device to display the keyboard 200 including virtual keys, a plurality of the virtual keys including a polysemous symbol and an associated Chinese radical, and to input a corresponding polysemous symbol upon selection of a virtual key. A memory 6 is included to store a plurality of symbol sequences, each associated with at least one Chinese character; and a processor 4 (such as a microprocessor 4 of FIGS. 3 and 3*a* for example) is used to compare a sequence of symbols corresponding to sequentially selected virtual keys, in response to each virtual key selection, to the plurality of stored symbol sequences, the integrated input and display being useable to display the at least one associated Chinese character upon the processor 4 determining a match between the sequence of symbols corresponding to sequentially selected virtual keys and one of the plurality of stored symbol sequences.

In at least one embodiment, such a keyboard 200 and processor 4 configuration can be used in association with a display as set forth above, with a speech processor to process and audibly output accessed Chinese characters, and/or with a phono-spell system.

The phono-spell system is related to phonetic appearance (in Pinyin Roman letters, for example) of a Chinese word. For example, yu2=鱼 (=fish)
    余 (=extra; surplus)
    于 (=at; in)
    盂 (=cup)

The user does not have to know the Chinese character of the word, only the phonetic appearance (this may be especially useful for children or illiterate people who may not know all the Chinese characters). This may be compared and contrasted with, for example, to an Autospell technique such as discussed in U.S. Pat. No. 5,210,689 entitled "System and Method For Automatically Selecting Among A Plurality of Input Modes" (the Baker '689 patent) issued May 11, 1993 to Baker et. al, the entire contents of which is hereby incorporated herein by reference, where the user would select a character.

Discussed hereafter is a non-limiting example for both Autospell and phone-spell.

For Autospell, for the word 'shorts'→duan3 ku4 (短裤):

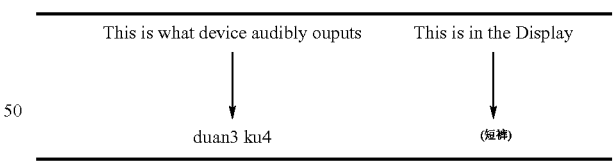

For Autospell, as the user continues selecting keys, the system realizes that the keys selected do not correspond to a symbol sequence (via comparisons for example), switches seamlessly to a spelling mode and outputs the Pinyin characters d u a n 3, and finally outputs (in a predictive mode associated with the Pinyin characters) possible Chinese characters (character prediction) which represent words: 1. (短裤) 2. 短绔 3. . . . .

The user then chooses the Chinese character which represents the desired word, and the device audibly outputs the character. In this case the user has to know the specific character to generate the word.

In Phono-spell, the embodiment is switched to audibly output the Pinyin input line (screen). The user can then type duan3 ku4 and, in this embodiment the system will audibly output the Pinyin letters or the input line, and in the display for characters will appear with an underscore as a place holder for the character.

In developing a Chinese character (such as for Mandarin Chinese (MC) language communication, for example) system capable of supporting generative language and Chinese character access/selection and output, it is important to draw on international experience in determining the most appropriate configurations for the many aspects of the keyboard 200 of the apparatus 8. The apparatus 8 utilizes multi-meaning icons (polysemous symbols), as shown on the keyboard 200 of FIG. 2. The keyboard 200 may further be an integrated input and display device, such as a touch-screen for example, for both displaying Chinese character output and selecting key input, and can be connected to/part of a speech synthesizer to produce the Chinese character output aloud. The speech synthesizer should be one capable of producing clear, intelligible Mandarin Chinese and the Chinese characters should, in at least one embodiment, be produced/output in written form in a display area, either as Chinese characters or in Romanization.

Through the combination of multi-meaning (polysemous) icons/symbols and icons representing grammar labels it is possible to encode vocabulary in fashion which gives the possibility of rapid language production and easy mastery of the communication device itself. The keyboard 200 of FIG. 2 combines, on at least some of the keys, a symbol (such as a pictorial illustration for example) and a Pinyin Roman letter, wherein the symbol has the same initial sound as the Roman letter in Pinyin. To this, the keyboard 200 further combines a Chinese radical (such as a traditional or simplified Chinese radical for example) that is an expansion of, or related to, the symbol and the sound. Such a Chinese radical may be present on the key (as shown in the upper right of at least some of the keys of the keyboard 200 of FIG. 2), or the polysemous symbol may just relate to a concept represented by the Chinese radical (such as, for example, the picture of the roof being related to the concept "roof", represented by the Chinese radical shown in the upper right of the key in row 6, column C of FIG. 2). Any and all of these in various combinations will prove important to the apparatus. These form the typical keys of the keyboard 200 in the apparatus 8 and constitute a very new kind of "associational environment."

Thus, both the Chinese radical and the symbol can be associated with various keys on the keyboard 200. As such, in at least one embodiment, an apparatus includes a keyboard 200 including keys, a plurality of the keys each being associated with at least two polysemous symbols (such as, for example, both a "pictorial symbol" as indicated in the center of keys of the keyboard 200 of FIG. 2 or 200a of FIG. 5, and a "Chinese radical" as indicated in the upper right of many keys of the keyboard 200 of FIG. 2 or 200a of FIG. 5); and a processor 4, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character.

As stated above, there are 214 Chinese radicals, but fewer than 100 of them are common. These radicals are used for assembling Mandarin Chinese (MC) characters and arranging them in dictionaries, similar to arrange words alphabetically. On the keyboard 200 of at least one embodiment of the present application, a drawing figure of a keyboard 200 or keyboard overlay 200, symbols for approximately seventy (70) of these MC radicals are included. However, the apparatus 8 of such a keyboard 200 may also work well with symbols for approximately fifty-five (55) of these MC radicals. Thus, the plurality of keys associated with a polysemous symbol relating to a concept represented by a Chinese radical are less than a total number of existing Chinese radicals, and are preferably less than half of the total number of Chinese radicals. For example, the plurality of keys associated with a polysemous symbol relating to a concept represented by a Chinese radical may be less than 40% of the total number of Chinese radicals or less than 30% of the total number of Chinese radicals. The Chinese radicals may include one of a simplified Chinese radical and a traditional Chinese radical, and further may include a radical pair as shown in FIG. 4b for example.

Figure 4A:
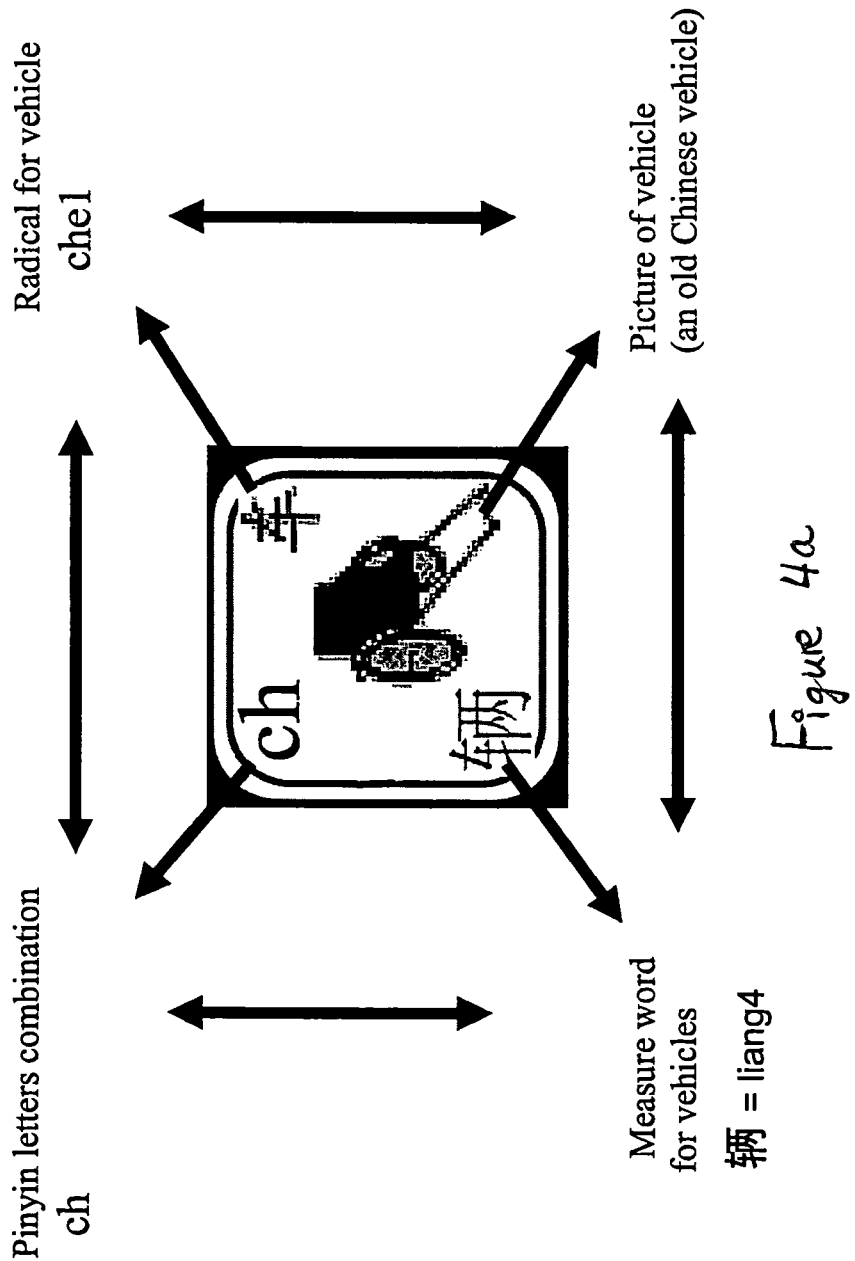
FIG. 4a illustrates an example key configuration of a keyboard of the first example embodiment of the present application.

FIGS. 4a and 4b illustrate example key configurations of keys of a keyboard 200 of the first example embodiment of the present application. FIG. 4a represents the key at location E-4 on the keyboard of FIG. 2. Such a key includes a polysemous symbol in the center area of the key, which in this case is a picture of an old Chinese vehicle, namely a rickshaw. In the upper right portion of the key is a Chinese radical. The radical is the radical for vehicle, written in Pinyin as "che1". Next in the upper left portion of the key is the Pinyin letter combination "ch", namely the Pinyin letters with which the Chinese radical "che1" begins. Thus, one or more Pinyin letters (such as a letter combination) may be associated with a key. As such, the symbol, Chinese radical and Pinyin letters are richly associated. Finally, the key includes in the lower left portion, the Chinese measure word for vehicles, namely "liang4". Again, the rich associations are maintained. An example involving Chinese measure words will be discussed hereafter.

Figure 3C:
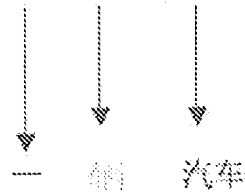
FIG. 3C illustrates another non-limiting example of a symbol sequence used to access at least one associated Chinese character.
Figure 3C:
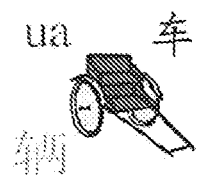
Figure 3C:
Figure 3C:
Figure 3C:
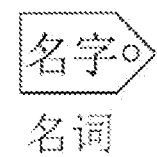

Shown below is one example of a symbol sequence used to access Chinese characters for the phrase "a car", thus including the noun and the measure word. Initially, the Chinese characters are shown (the measure word being the first character), followed by the Pinyin equivalent (liang4 equating to the measure word) and then the English phrase "a car". Liang4 is measure word for vehicles (oh wheels). Reference is made to FIG. 3C.

liang4 is Measure Word for Vehicles (on Wheels)

As shown in FIG. 3C, in Pinyin, it would take a person sixteen key selections or "hits" to input the Pinyin letters and numbers equating to the phrase "a car". However, only five sequenced hits of keys including the polysemous symbols of the present application need be used to access and then output the three Chinese characters shown above, including the first measure word character. Essentially, the processor 4 recognizes the selected keys and the symbols associated therewith, buffers the symbols in sequence of selection, and compares, for example, the sequenced symbols to stored symbol sequences in memory 6. If a match is found, such as the five symbol sequence shown FIG. 3C, then the Chinese character(s), including the measure word character if present, may be output via output unit 7 (displayed for example) and/or audibly output via speaker 14 for example. Thus, the output may include an associated measure word.

FIG. 4b represents the key at location E-6 on the keyboard of FIG. 2. Such a key includes a polysemous symbol in the center area of the key, which in this case is a picture of an Asian style knife. In the upper right portion of the key is a Chinese radical. The radical is the radical for knife, written in Pinyin as "dao". The Chinese radical actually includes two radicals associated with knife, namely the "cut" radical on the left and the "sharp" radical on the right. Thus, one or more radicals may be associated with a single key. Next in the upper left portion of the key is the Pinyin letter "D", namely the Pinyin letter with which the Chinese knife radical "dao" begins. As such, the symbol, Chinese radical and Pinyin letter are richly associated. Finally, the key includes in the lower left portion, the Chinese measure word for knife, weapon, chair, etc., namely ba3 (used to refer to small objects which can be held in the hand). Again, the rich associations are maintained. However, it should be noted that for the purpose of embodiments of the invention, the Chinese radical can be any of a traditional Chinese radical and a simplified Chinese radical and the symbols can include pictorial illustrations.

Figure 3D:
FIG. 3D illustrates another non-limiting example of a symbol sequence used to access at least one associated Chinese character.
Figure 3D:
Figure 3D:
Figure 3D:
Figure 3D:
Figure 3E:
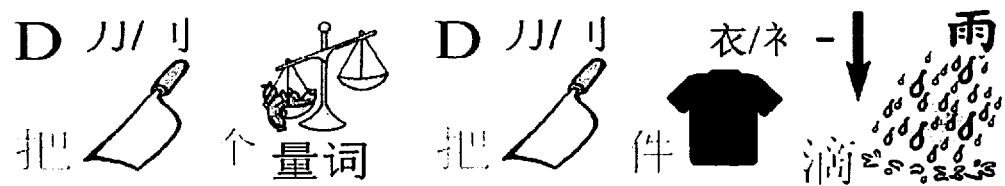
FIG. 3E illustrates another non-limiting example of a symbol sequence used to access at least one associated Chinese character.

Shown in FIGS. 3D and 3E are non-limiting examples of symbol sequences used to access Chinese characters for the phrase "a knife", and for the phrase "an umbrella", including both the noun and the measure word. Initially, the Chinese characters are shown (the measure word being the first character), followed by the Pinyin equivalent and then the English phrase "a knife" or "an umbrella".

As shown FIGS. 3D and 3E, in Pinyin, it would take a person ten key selections or "hits" to input the Pinyin letters and numbers equating to the phrase "a knife" or "an umbrella". However, only five sequenced hits of keys including the polysemous symbols of the present application need be used to access and then output the two Chinese characters shown above, including the first measure word character. Essentially, the microprocessor 4 recognizes the selected keys and the symbols associated therewith, buffers the symbols in sequence of selection, and compares, for example, the sequenced symbols to stored symbol sequences in memory 6. If a match is found, such as either of the five symbol sequences shown above, then the Chinese character(s), including the measure word character if present, is output via output unit 7 (displayed for example) and/or audibly output via speaker 14 for example.

On the keyboard 200 of an embodiment of the present application, these Chinese radicals may be combined, or have concepts associated with pictures and polysemy. This unique and novel concept will prove to be practical—even powerful, in and out of the AAC community.

Some accommodations are first made with word prediction, both in Pinyin and with the Hanzi. First, a version of AutoSpell™ is created by extending, in a novel and unobvious way, the concepts from U.S. Pat. No. 5,210,689 entitled "System and Method For Automatically Selecting Among A Plurality of Input Modes" (the Baker '689 patent) issued May 11, 1993 to Baker et. al, the entire contents of which is hereby incorporated herein by reference, as well featuring character prediction in Pinyin and other kinds of prediction with Hanzi, by extending, in a novel and unobvious way, the concepts from U.S. Pat. No. 5,097,425 entitled "Predictive Scanning Input System For Rapid Selection of Visual Indicators" (the Baker '425 patent) issued Mar. 17, 1992 to Baker et. al, and the concepts from U.S. Pat. No. 5,297,041 entitled "Predictive Scanning Input System For Rapid Selection of Auditory and Visual Indicators" (the Baker '041 patent) issued Mar. 22, 1994 to Baker et. al, the entire contents of each of which is hereby incorporated herein by reference.

For example, automatic recognition of a Pinyin spelling mode or a symbol sequence mode, and automatic switching of the modes, occurs in at least one embodiment by the apparatus including a memory 6, to store the plurality of symbol sequences, each in association with at least one Chinese character. The processor 4 is then adapted to receive both an associated Pinyin letter (or Bopomofo letter in the second embodiment) and an associated symbol in response to selection of a key including both an associated Pinyin letter (or Bopomofo letter in the second embodiment) and an associated symbol, to compare a sequence of selected symbols to the stored plurality of symbol sequences in memory 6 in the manner discussed above after each key selection, and to output Pinyin letters, recognizing a Pinyin letter mode, (or Bopomofo letters, recognizing a Bopomofo letter mode in the second embodiment) associated with selected keys upon determining that selected symbols of selected keys do not correspond to any of the stored symbol sequences. Of course, if a symbol sequence is recognized, the apparatus stays in a symbol sequence mode, or switches from a Pinyin letter mode to a symbol sequence mode, to output the at least one Chinese character associated with the symbol sequence of selected keys.

The apparatus of the present application, in at least one embodiment, uses of new and unexpected indicia (including, for example, the combining of polysemous symbols on keys with Chinese radicals and Pinyin sounds). In the past, the old Semantic compaction systems used symbols in combination with only 26 letters; but now the new apparatus of at least one embodiment of the present application uses a whole new set of indicia—including thousands and thousands of possible Hanzi or Chinese characters. Further, the new system uses interrelationships between and among these Hanzi. The pictorial icon (polysemous symbol) on a key, associated with or accompanying the Chinese radical, not only relates to the radical through picturing one of its meanings, but extends the meaning of the radical to other related and culturally unrelated concepts (thus making the Chinese radical polysemous). The pictorial aspect of the radical also relates in phonetic ways and non-phonetic ways to the pictorial icon. One way is to show an idea associated with an idea commonly expressed by Mandarin Hanzi (Chinese characters) which contain the radical pictured on the associational environment referred to as "the key."

Character prediction, different from word prediction or icon/symbol prediction and thus a unique extension from the Baker '425 and '041 patents, is created in at least one embodiment of the present apparatus and method. It simply means that after you spell "p," "i," there are only certain characters that can end the syllable. One of them is "n." There are just a few other Roman or Latin characters that can follow "pi" in the Pinyin system. At a certain point near the end of the second syllable, there is a necessary switch to numbers. Using character and numeral prediction at this point with multi-meaning icons is a totally unique concept.

Character prediction has, for many years, been used in English and other languages based upon distributional regularities found in the spelling systems of English and other western languages. The distributions and the number of Roman letters in Pinyin syllables and the use of an accompanying number to express tone, allows for greater prediction of following letters or numbers. There are only five numbers used in Pinyin (1, 2, 3, 4, and 5). Following the number, no second number is possible. These regularities can help predict a potential next character through the use of syllable prediction, not mentioned in any previous patent or related material.

There are predictabilities within the Chinese sound system which can be exploited. Relating the polysemous icons of at least one embodiment of the present application to the structures of Chinese phonetics as portrayed by Mandarin Chinese distribution formalisms is an unexpected use of pictures. Mandarin Chinese is thought of as a language written without an alphabet. The system is further useful for scanners and others learning Pinyin. Basing a language retrieval system upon relationships of pictures to a sound-based system related to Roman letters is novel, unobvious, has not been done before in this way. Hanzi are not phonetic, and the apparatus and method of at least one embodiment of the present application use letter associations to construct symbol sequences to come up with Hanzi. Such symbol sequences may be stored in memory 6, each in association with at least one Hanzi or Chinese character, such that upon selection of keys associated with the sequenced symbols, the stored associated Hanzi may be output via output unit 7 (for at least one of display and speech output, for example).

The use of sequenced multi-meaning icons in at least one embodiment of the present apparatus and method, to access Hanzi characters, also iconically based, is also a novel and unobvious concept extending from U.S. Pat. No. 4,661,916 entitled "System and method for producing synthetic plural word messages" (the Baker '916 patent) issued Apr. 28, 1987 to Baker et. al. While the Baker '916 patent discussed how to sequence multi-meaning symbols based on different associations and different symbol combinations, the new Chinese character keyboard 200 and apparatus 8, for which a separate overlay figure is shown in FIG. 2 for example (wherein it should be noted that, the overlay figure is just a keyboard overlay (such as a touch screen of a virtual keyboard or overlay for a hard keyboard for example) for a complete apparatus for output (display, speech synthesis, etc.), includes many keys with polysemous icons (such as pictorial illustrations for example), each associated with a Chinese radical. The keyboard 200 shown in FIG. 2 further includes many keys including the Chinese radical, a Pinyin letter. This three way combination of a polysemous icon or symbol, the Chinese radical and the Pinyin letter forms a rich association which has never been known or used before in Chinese typing systems or in any Chinese AAC system, as will be explained hereafter.

For example, as shown on the keyboard 200 of FIG. 2 of an embodiment of the present application, a key is located at address D-4 (note that hereinafter, a capital letter followed by a dash and a number, when referencing the keyboard 200, references a column (letter)-row (number) location on the keyboard 200). This key at address D-4 has a picture of a mountain, the Chinese radical associated with mountain, and the Pinyin letters (SH→shan1=standing for mountain/hill) for the mountain sound. The SH sound is the first sound (Pinyin sound) in the Chinese word for mountain. Thus, selection of this key, combined with others, can be used to access related Chinese characters.

By using these three richly associated elements on one key of the keyboard 200, a person (in the AAC community, or even a non-handicapped person), can easily recognize the picture and sound, which can help him/her quickly recall the Chinese radical. The symbols create the visual connection between Pinyin letters and Chinese radicals in a manner not previously known in Chinese word processing systems, let alone Chinese speech processing systems. A person who does not read MC Hanzi may not know that the mountain radical means mountain. As used in Hanzi, these graphics can, although referring to a mountain in some way, relate in novel and unexpected manners to the semantic concept to be described hereafter.

The word Japan, for instance, is a two character word. The first character is the radical of the sun. The second character is the radical of the tree, combined with a secondary component which means "bottom." The word for Japan is in no way phonetically represented by tree and sun. It just means East, because the sun comes up through the trees. It is a very ancient system filled with contradictions and inconsistencies, but it started out as pictorial. Both the radical/Hanzi of the sun and the tree can exist in the apparatus 8 and method of at least one embodiment of the present application. Consequently, two symbols are used in an embodiment of the method and apparatus of the present application to access the Chinese characters/Hanzi for "Japan", combined with a strategy for indicating noun-ness.

The noun-ness "Japan" comes from the close physical association of the two Hanzi together and the fact that there is a little horizontal bar put at the base of the three to indicate root or bottom. Thus, there are, in reality, three separate components, and the use of graphical separation indicating the word-ness of the Hanzi, composing "Japan." When keys are selected, in at least one embodiment of the present method and apparatus, these two symbols together, preceded by the correct presence or absence of the associated measure word, said the word "Japan" is accessed without adding the "root bar" at the base of the tree.

Pinyin typing is normally done from a typical known QWERTY keyboard. Words are separated by a space and there is a number at the end of each syllable. The apparatus 8 and method of at least one embodiment of the present application includes a fewer number of key selections than the letters and number hits used in Pinyin via the known QWERTY keyboard. A Pinyin syllable has mostly three letters and a number, equating to four key selections or "hits". More than 60 percent of MC words have more than two syllables.

The apparatus 8 and method of at least one embodiment of the present application typically have no more than three hits/key selections to access an associated at least one Chinese character. Thus, eight Pinyin selections (via the known QWERTY keyboard for example), compared to three key/symbol selections (via the new apparatus 8 and method of at least one embodiment of the present application) will be typical.

For the augmented communicator; such a savings is of massive significance. That this kind of savings can be done using a restricted keyboard 200 such as that shown in FIG. 2 in which symbol prediction, in at least one embodiment, can assist learning and in which scanning, in at least one embodiment, can provide serious assistance for the augmented communicator. This approach is novel and no amount of work with western languages would have prepared us to be aware of these issues and their exploitability in MC.

The foregoing ideas are absolutely new in relation to MC and entering MC radicals. This has been a bigger adjustment than just translating systems into German, French, etc. With European language, morphology—"-ing," "-ed," "-er," "-est," etc. was combined with parts of speech. Both morphology and part of speech were associated with a key and when selected, with great precision, the various forms of specific words were accessed. For example, the word "good" was accessed from memory by selection of the key associated with the THUMBS UP symbol plus selection of the key associated with ADJECTIVE. "Better" was accessed from memory by selection of the key associated with the THUMBS UP symbol plus selection of the key associated with ADJECTIVE-er. "Best" was accessed from memory by selection of the key associated with the THUMBS UP symbol plus selection of the key associated with ADJECTIVE-est. This allowed great specificity in relationship to the formalisms in western languages.

The formalisms in Mandarin Chinese and some other eastern languages require different approaches which are unique. They represent a step forward.

The discussion begins with semantic word groups. Word groups in English can be organized in many ways. One way is to group them in a category, such as "kitchen words." Access of words in this "category" may start with selection of a key associated with the polysemous icon of a boiling pot with a thermometer in it (POT). "Cook" may then be accessed by selecting the key associated with the POT icon plus selecting of the key associated with VERB. "Hot" may be accessed by POT plus ADJECTIVE. Two aspects of the initial icon or symbol may be exploited here. Both the pot and the thermometer resonate in the English/American culture—the pot for cooking and the thermometer for heat measures. Some other examples are as follows.

VERB Examples

POT+POT+VERB=bake

POT+MUSIC NOTE+VERB=beat

POT+DICE+VERB=shake

POT+JUICE+VERB=pour

POT+RAINBOW+VERB=mix

POT+THUMBS UP+VERB=warm

POT+THUMBS DOWN+VERB=cool

POT+RETURN+VERB=stir

ADJECTIVE Examples

POT+VERB=hot

POT+LEI=mild

POT+SUMMIT+ADJECITVE=cold

POT+THUMBS UP+ADJECTIVE=warm

POT+THUMBS DOWN+ADJECTIVE=cool

The verbs would, of course, all have their forms such as "shake," "shook," "shakes," "shaking," and "shaken." This is amazingly precise.

In at least one embodiment of the apparatus 8 and method of the present application, a whole new set of strategies are developed with MC. These strategies often blend the MC radical, the Pinyin roman letter, and the polysemous symbol, which may be a pictorial icon for example, (as well as the measure words on the lower left of some keys, as shown in FIG. 2, for example) with its cultural associations.

For example, as shown in FIG. 2, at location G-6, the symbol for "work" is shown (the icon of wood nailed together to form the letter I). The shape of the picture on the key (the wood nailed together to form a capital I shaped symbol) further relates to, or is associated with the MC word "gong1" corresponding to the Chinese radical shown on the upper right of the key, which means work. The Pinyin letter G on the key at location G-6 is the beginning sound (not spelling letter) for the MC word gong1 for work.

These strategies are so different from the ones the inventors of the present application used with European languages in the Baker '916 patent disclosed above, regarding both the strategy and the target of the strategy. In the past systems, the icon and letter were related by spelling and picture (see the Baker '916 patent for example). In MC, this icon is related to the sound of the word (by spelling in Pinyin), a kind of real spelling because of the Chinese radical which is combined with the icon and a symbol, like the wood for handcraft.

Another example is shown in the location C-5, for "ride". The MC word for ride is qi2 (Pinyin and sound). The Pinyin letter is "Q". The icon associated with the key at location C-5 shows a bicycle, which is a symbol for a ride, wherein the associated Chinese radical associated with the key at location C-5 is also the "riding, moving" radical, thereby illustrating the association of the Pinyin letter, Chinese radical and symbol.

The mixing of polysemy with MC radicals, Pinyin Roman letters, pictorial icons/symbols and word groupings and word families not based solely on part of speech is different from what was done before. First of all, old systems including those described in the various Baker patents above, never had two characters on a key capable of being polysemous. Before, the old systems had either a letter or a number, along with one polysemous symbol. Now, in the new apparatus and method of at least one embodiment of the present application, an additional polysemous element is included, the MC radical.

The Chinese radical is both a concept and an image. The Chinese radical shown in the upper right of key location D-4 of FIG. 2 for MOUNTAIN, for instance, can refer to "highness" or "height", as well as to "riches" (noting that a typical MC symbol for wealth is mountain), as well as whatever else the radical happens to look like, e.g. the mountain Chinese radical also looks like a pitch fork. Word families can be based on the combinatoric properties of the mountain Chinese radical which are also arbitrary—the mountain Chinese radical can sometimes be used with something which has nothing to do with mountains, and can be used to encode words. Sometimes, the mountain Chinese radical is used with a physical metaphor like "big-ness, esteem;" wherein sometimes it is used with a conceptual metaphor like "distance"—far away.

Because the Chinese radical has also a pictorial aspect, its pictorial aspect can be invoked readily, in combination with the picture of an icon associated with the same key, to arrive at a new synthesis. The resemblance in the MC Hanzi radical thereby becomes much more noticeable and consequently exploitable. It was not noticeable that the Chinese radicals would provide such easily achieved metaphors on the basis of their forms. Further, no one else has used this, in relationship to Pinyin Latin letters, nor has anyone else added pictures (polysemous icons) to the keys of a Chinese word processing system or keyboard.

Mandarin Chinese is different from most western languages in its positioning of nouns. In English, nouns are mass nouns or count nouns. A mass noun like "sugar" refers to a quantity and does not have a plural. "Sugars" in common usage would imply either little packages of sugar or various chemicals called "sugars" because of their hydrogen/carbon bonding relationships. The phrase "I want some sugar" would generally refer to loose granular sugar to be spooned into a teacup. "I want some sugars" would be something a chemist might say to a supplies person.

"Horse" as slang for "heroine" is a mass noun. "I want some horse" makes sense on the drug scene. In regular usage, "horse" is not a mass noun. It is a count noun. After "some," one would need the plural "horses." For example, the king could say, "I want some horses." This explanation is a kind of introduction for Homonyms (not really measure words), as will be explained further hereafter.

There may be, in at least one embodiment, a function on the keyboard 200 for Homonyms, which makes it possible to write e.g. yu and the 41 different Homonyms appear, so that the user can select keys (symbols) to access the one desired character.

E.g.

yu2= 鱼 (=fish)

余 (=extra; surplus)

于 (=at; in)

盂 (=cup)

The words "few" and "less" are usually all the average person hears about mass and count nouns in English. A teacher will correct a student when he or she says, "The king had less horses than he wanted." The teacher will say, "Say 'fewer' horses." We've all been corrected with this mass noun/count noun error.

MC has very strict rules concerning mass nouns and count nouns. These rules involve an entire category of words that are not used in English, called "classifiers" or "measure words" (MW). For example, "ben3" (at location D-7 on the keyboard 200 of FIG. 2) is the measure word for anything that looks like a book. And "zhang1" (at location K-5 of the keyboard 200) is the measure word referring to flat, open surface.

Thus, one would not say "Give me the zhang1 planner." One would say, "Give me the ben3 planner." These measure words are not used with plurals of count nouns. They are used only with count nouns. Mass nouns have no quantifiers but instead have particles like "xie1" which indicates a mass noun. It is equivalent to "some."

As confusing as this may be, the inventors of at least one embodiment of the present application discovered that it presents a marvelous opportunity to avoid marking nouns directly by using the more than 50 different measure words and the several particles to signal the presence of a noun without using a noun grammar key.

The inventors of at least one embodiment of the present application make this work in the MC apparatus and method with polysemous multi-meaning icons. MC nouns have certain ways of being used so that their presence can be detected through artificial intelligence. One way is through the presence of an adjective. The next way is through the presence of a measure word, and the next way is through the presence of a mass noun/count noun word, or the presence of a pluralizing suffix. If all of these things are looked at and an apparatus is designed to use "part of speech" as an identifying element to enhance efficiency, the MC noun need not have its own distinctive marker because its position along the syntagmatic axis or flow of words is signaled by what precedes it or what follow it. Taking advantage of this phenomenon could only happen in a language representation system which uses part of speech as an identifying element.

For non-readers, having a pictorial language so closely allied to the typical reading language without specifically using all of the elements of the reading language would create a novel bridge between reading and non-reading and would develop an efficient and powerful teaching tool as well as half-way house for children not able to read or generate their own thoughts through either Hanzi or Pinyin.

The more literate a person is, the more he or she uses different MWs. The MW "ge5" is grammatically permissible for all count nouns in the singular. Using such a MW is done by children and in non-standard, casual speech. "Y'all know what we means."

In the MC apparatus or method of at least one embodiment of the present application, a double hit on the same key is used devoted to "ge5," another two hit may be devoted to direct access of a measure word, etc. Thus, in at least one embodiment, great efficiency can be introduced and straight-forward language sense can be conveyed to an MC native speaker.

The key at location G-2 of the keyboard 200 of FIG. 2 includes the symbol in the lower left corner for the measure word "ge5"; e.g. it may be the only dedicated measure word key (the symbol or icon is the picture of a scale). There may be a function where access of such a measure word is automatic, but the Mandarin language requires that it is also possible to generate measure words by themselves, on at least some occasions. Further, this may also be useful in that Chinese people sometimes may want to answer a question with just a count or measure word.

Some examples may be as follows: How many birds do you have? The answer may be: "3"; in Mandarin it would be 3 and the measure word for birds "san1 zhi1" (san1=three zhi1=measure word for little animals).

Other measure words are related to nouns to be measured and are found associated with keys related to their use (for example things one can drink includes the measure word on the key including the tea set symbol at location M-8 of the keyboard 200 of FIG. 2, or the EYE symbol at location K-7 with the measure word for "pair", e.g. pairs of eyes, legs, socks, etc.).

For example, at location F-8 on the keyboard 200 of FIG. 2 is the RICE key including the measure word for "food" and at location J-5 is the T-SHIRT key including the measure word for clothes. The measure word is a Hanzi-like regular word, which cannot really be used by itself. Such a word needs to be used in a context. In English, it may be "one", e.g.: "the one I showed you." This makes sense only when the dialog partner knows the meaning or context of "one".

Thus, measure words can be generated by itself or the Hanzi may be automatically added to a noun. Both ways are possible.

In at least one embodiment of the present application, the microprocessor 4 recognizes the following sequence of selected symbols from key selections of the keyboard 200, at the following columns-rows, and thereafter accesses, from memory 6 for example, the following Chinese characters and corresponding measure words (spelled out in Pinyin):
E.g.: EYE (K-7), MW (G-2), T-SHIRT (J-5), FOOT (E-3)= shuang1 wa4 (=a pair of socks); and
GLOBE (G-5), MW (G-2), PEACH (M-5), PEACH (M-5)= xie1 tao2 (=some peaches).

The examples of measure word symbols are on 46 of the keys in the lower left corner of the keyboard 200 of FIG. 2. These are the 46 most commonly used measure words in MC. For example, such MW symbols are shown on the "KNIFE" key (location E-6 of the keyboard 200 of FIG. 2), the "MUSIC NOTE" key (location J-8 of the keyboard 200 of FIG. 2), and the tea set" key (location M-8 of the keyboard 200 of FIG. 2). The MW symbol (simplified character) is associated with the type of item displayed in the polysemous icon or symbol (the MW symbol at location E-6 is the measure word "the" used for "sharp" objects, such as the KNIFE).

Thus, the selection of the measure word can serve to signal that the intervening sequence accesses, for example, a noun.

In at least one embodiment, an apparatus 8 includes a keyboard 200 including keys, a plurality of the keys each being associated with a polysemous symbol and a Chinese measure word, the Chinese measure word associated with a key providing an indication of symbols sequenceable with the polysemous symbol associated with the key; and a processor 4, to, in response to determining that a plurality of selected symbols form a sequence of symbols associated with at least one Chinese character, instruct output of the at least one Chinese character. A memory 6 may be included to store the plurality of symbol sequences, in a database for example, each in association with at least one Chinese character. Further, similar to the embodiments discussed above, a display may be included to display the output at least one Chinese character associated with the sequence of selected symbols. The aspect of the Chinese measure word associated with a key providing an indication of symbols sequenceable with the polysemous symbol associated with the key will be discussed hereafter as follows.

Measure Words are an important feature of the Mandarin Language. All count nouns have a measure word preceding the noun. There are more than 50 common measure words and they function in the same way or a way similar to the way the article "a", "an" and "the" in English or "la", "le", "un", "une", in French.

In German, "der", "die", "das", are the masculine, feminine or neuter singular articles. If the noun you're using like Buch is neutral gender and requires "das" so that the phrase "the book" in German is "das Buch". The German word for "sun" is Sonne and is arbitrarily assigned to the category feminine. Thus "the sun" in German is "die Sonne". Similarly, the German word for "table" is masculine and requires a masculine article "Der." Thus, "the table" in German is "der Tisch." The German article—equivalent to the English article "the"—has three forms when it modifies a noun in the nominative case. In the dative case—indirect objects—the German word for "the" is "den," "der," and "dem" when "the" modifies masculine, feminine, or neuter nouns. The complexities involving articles from language to language are numerous.

In Mandarin Chinese, there are more than 50 different articles, or measure words for count nouns (nouns that have singular and plural forms—book, books). The differences among the articles, or measure words do not depend upon variations of gender or case as in German, but variations of semantic category. For example, most nouns that stand for rectangular objects have the article zhang1. This includes, tables, sheets of papers, beds, and even the human mouth. Nouns that stand for large, relatively permanent things, such as mountains and skyscrapers, have the measure word zuo4. These articles, or measure words, are a challenge to represent in a system designed to minimize keys and key selections in generating language.

The current embodiment of the invention addresses these challenges—the cognitive challenge of many different keys and the physical challenge of added keystrokes in a novel manor that optimizes the number of keys in the system as well as the number of keystrokes required to generate language with the system.

First, in an embodiment of the present application, the Mandarin Hanzi for a particular measure word are associated with and displayed in the lower left hand corner (for example) of a key (for example, see FIGS. 4a and 4b) including an icon representing a prototypical object using the measure word. When the user selects the key with the prototypical object followed by the key designating measure words (the Scales for example), that particular measure word is output, e.g. spoken or printed out for example.

In at least one embodiment of the present application, the icon sequence for the noun that follows the measure word falls into the particular measure word category spoken out by the machine, and can be any legal sequence to represent nouns. To take advantage of the fact that the measure word is based on a semantic category, the initial icon in the sequence for a noun can be the key representing the prototypical object. Such an organization is possible but not necessary. However, having the icon sequence for a particular noun based upon its semantic category gives the ability to the system designer to construct a sequence which is initialized by the key with the prototypical object as its icon. Because of the semantic organization in an embodiment of the application, noun categories can be organized so that such mnemonic felicities can be used regularly in the structuring of sequences for nouns. The ability to structure noun categories along semantic pictorial lines aids in learning, teaching, and remembering the system as a whole. As such, the Chinese measure word associated with a key can provide an indication of symbols sequenceable with the polysemous symbol associated with the key However, one does not have to use the prototypical object for the measure word as an element in the icon sequence. Other purposes can be served in structuring a noun sequence such as physical proximity of one key to the key that precedes or follows it. Such freedom in structuring allows the pursuit of physical ease—distance of one key from another or ease of visual disambiguation (two keys of the same or similar color side by side, for example) to be minimized or maximized to achieve various goals of optimization.

Figure 4C:
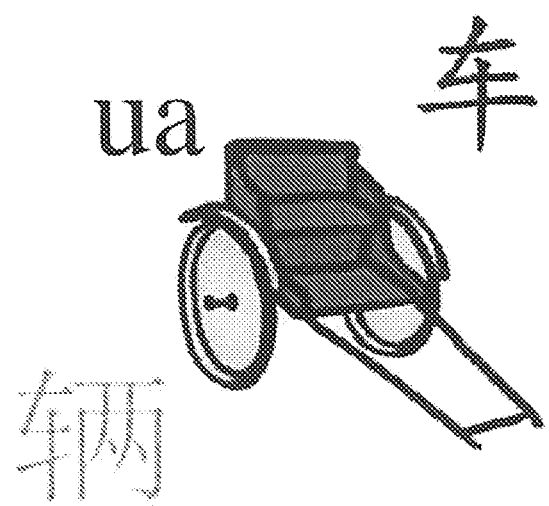
FIG. 4C illustrates a non-limiting example of a polysemous symbol associated with a key.

Hereafter, non-limiting examples are shown to further illustrate and explain the concept of the Chinese measure word associated with a key providing an indication of symbols sequenceable with the polysemous symbol associated with the key as shown in FIG. 4C for example.

The illustration in FIG. 4C of a rickshaw is used a prototypical example of the measure word for "wheeled objects." The Chinese characters or Hanzi for that measure word is in the lower left corner of the key and is pronounced "liang4."

Figure 4D:
FIG. 4D illustrates another non-limiting example of a polysemous symbol associated with a key.

When selection of this key is followed by selection of the key including the Scales seen in FIG. 4D for example, the system outputs "liang" and/or its Hanzi. The function of the Scales is a regulator of measure words.

The universal measure word that can be used with any noun that uses measure words is "ge." When Scales key is selected twice, the system outputs in Hanzi and/or Pinyin/acoustically "ge" or the universal measure word. When Scales is the second key in a symbol sequence, it causes the system to output whatever measure word was in the lower left hand corner of the preceding key, just as rickshaw followed by Scales produced "liang4."

Figure 4E:
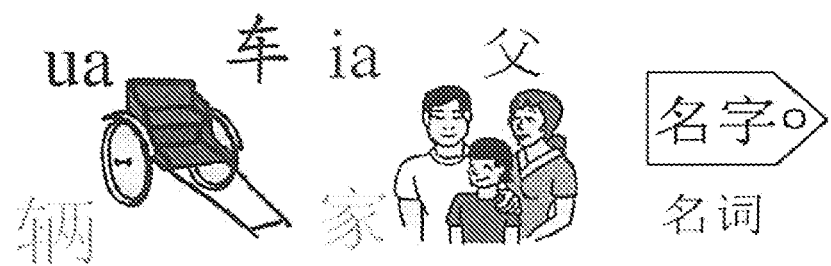
FIG. 4E illustrates another non-limiting example of a symbol sequence used to access at least one associated Chinese character.
Figure 4F:
FIG. 4F illustrates another non-limiting example of a symbol sequence used to access at least one associated Chinese character.

The key sequence for car is shown in FIG. 4E for example. The rickshaw key stands for transport in general. The people key combined with the rickshaw key stands for people transport or "car." The last key in the sequence illustrating an attachable label, stands for nouns in general. In order to generate "car" in Mandarin using Pinyin, requires the system operator to spell qi4che1 (space). The required number of key selections is eight. The system of an embodiment of the present application discussed above requires only three key selections. In order to generate "the car" in Mandarin, the system of an embodiment of the present application requires two more keystrokes as opposed to seven more Pinyin keystrokes. See FIG. 4F for example.

Thus "the car" in Pinyin requires fifteen key selections and the system of an embodiment of the present application requires only five key selections. Thus, the system of an embodiment of the present application offers a 66% reduction over Pinyin using the base strategy.

Figure 4G:
FIG. 4G a non-limiting example of a measure word key.
Figure 4H:
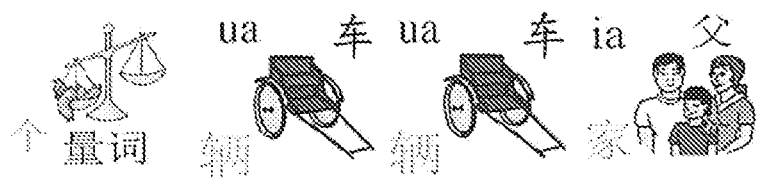
FIG. 4H illustrates another non-limiting example of a symbol sequence used to access at least one associated Chinese character.

An advanced strategy allows for further reductions in the system of an embodiment of the present application. If one begins the sequence with the measure word key as shown in FIG. 4G, for example,
and follows it by the rickshaw, the devices knows that the next icons must be a noun, negating the necessity to add the terminal noun label. Thus, the sequence shown in FIG. 4H is a legal sequence, in the system of an embodiment of the present application, for "the car"—four key selections in place of fifteen key selections or a savings of 74%. Such keystroke or key selection savings in the system of an embodiment of the present application over Pinyin are typical throughout the system of an embodiment of the present application. For a user with disabilities, the option of a double hit on the rickshaw further reduces movement when keys are being selected directly and the reduction of a complete scan cycle when indirect or scanning methods of physical selection are being used.

A lot of Chinese words, which are different in Hanzi with totally different meanings, include pronunciations (Pinyin) which are exactly the same (homophone-like). The speech synthesis system of an embodiment of the present application is empowered to produce voiced words which sound exactly like other voiced words, but which are represented by different accessed Hanzi (characters). This can be done within the MC system because the Hanzi are not phonetically based. In English, "night" and "knight" sound alike, but are spelled somewhat differently. With Chinese Hanzi, the difference is total. The homophone phenomenon plays only a small role in English, but plays a very large role in MC.

The polysemous icons enables users of the apparatus of at least one embodiment uses different sequences to produce the same sound, but have different Hanzi in the final realization (text area). Currently, Pinyin cannot really do this. Thus, the technology of at least one embodiment is novel and powerful.

The inventors of the present application recognized suffix and prefix in MC words have certain predictable factors. In English, the MC idea of "complement" is not a common function. A "complement" in MC is a modifying suffix. Somewhat similar to the complement in MC is the phrasal verb in English. "Look at the book," "Look up the word," "Look over the material," are phrasal verbs in English. The "at," the "up," and the "over" are not interchangeable. "Look up" is a totally different activity from "Look at."

The complement function in Mandarin is broader than the semantic function of the phrasal verb in English. One does not just change the sense (meaning) of the word, one changes what we in English would call the modality of the word as well. The MC word for "look" can be modified by a suffix to mean "see." This is somewhat like the sense change in English. However, another suffix can change the meaning from "look" to "can see" or "cannot see."

In MC, there are seven complements—many fewer than the prepositions available for English phrasal verbs. These complements are resultative complement, potential complement, simple directional complement, complex directional complement, time/measure complement, action/measure complement, and degree complement.

The function of such verbal suffixes is deeply structural and the inventors of the present application discovered that they can be usefully depicted with multi-meaning sequenced icons. In the past systems of the Baker patents, sentence structure was not influenced by icon sequences attached to particular words. The ability to do this in MC is a novel use as well as a powerful use of sequenced multi-meaning icons.

For example, the apparatus of at least one embodiment uses a compliment for the phrase " . . . and he was talking and talking" by:
COMPLE (K-2), RETURN (N-7), CELLPHONE (F-4), MOUTH (K-5)=deng3 yan1="talking and talking".

In Chinese, to say "finish," will be in the following form: VERB (specific)+wan2 (suffix for "finish") meaning "finish." The verb will be changed because of the different subjects. "Finish eating" will be "chi1+wan2 (suffix)" and "finish laundry" will be "xi3+wan2 (suffix).

Figure 4I:
FIG. 4I illustrates another non-limiting example of a symbol sequence used to access at least one associated Chinese character.

In Mandarin, one can change the sense of a word by adding a suffix. See FIG. 4I for example.

Prefixes can be uniquely represented (and accessed) by sequenced selected multi-meaning icons. We have some common prefixes, e.g., the word "old" as the prefix to talk about anything you want to show respect. For instance, if someone is addressed in MC, they will not use a first name as it is common in English. In MC, an old plus surname is used to address someone who is older than you and "small" in front of the surname is used to address someone who is younger than you. The use of such prefixes can eliminate certain types of grammar keys and different semantic fields such as the necessity to assign a particular sequence as a name.

For example, a prefix can be used for access of the phrase "old story" by:
PREFIX (J-2), WIND (K-6), BOOK (D-7), BOOK (D-7), NOUN (G-1)=lao3 gu4shi5=old story.

A simple icon on an MC overlay such as that of FIG. 2 may contain three or four pieces of information for encoding. For instance, the icon at location E-6 of the keyboard 200 of FIG. 2 (KNIFE) has the following information on the key—a picture of knife, the Pinyin initial "D", the knife Chinese radical (right hand corner) and the measure word for knife (lower left hand corner).

Figure 5:
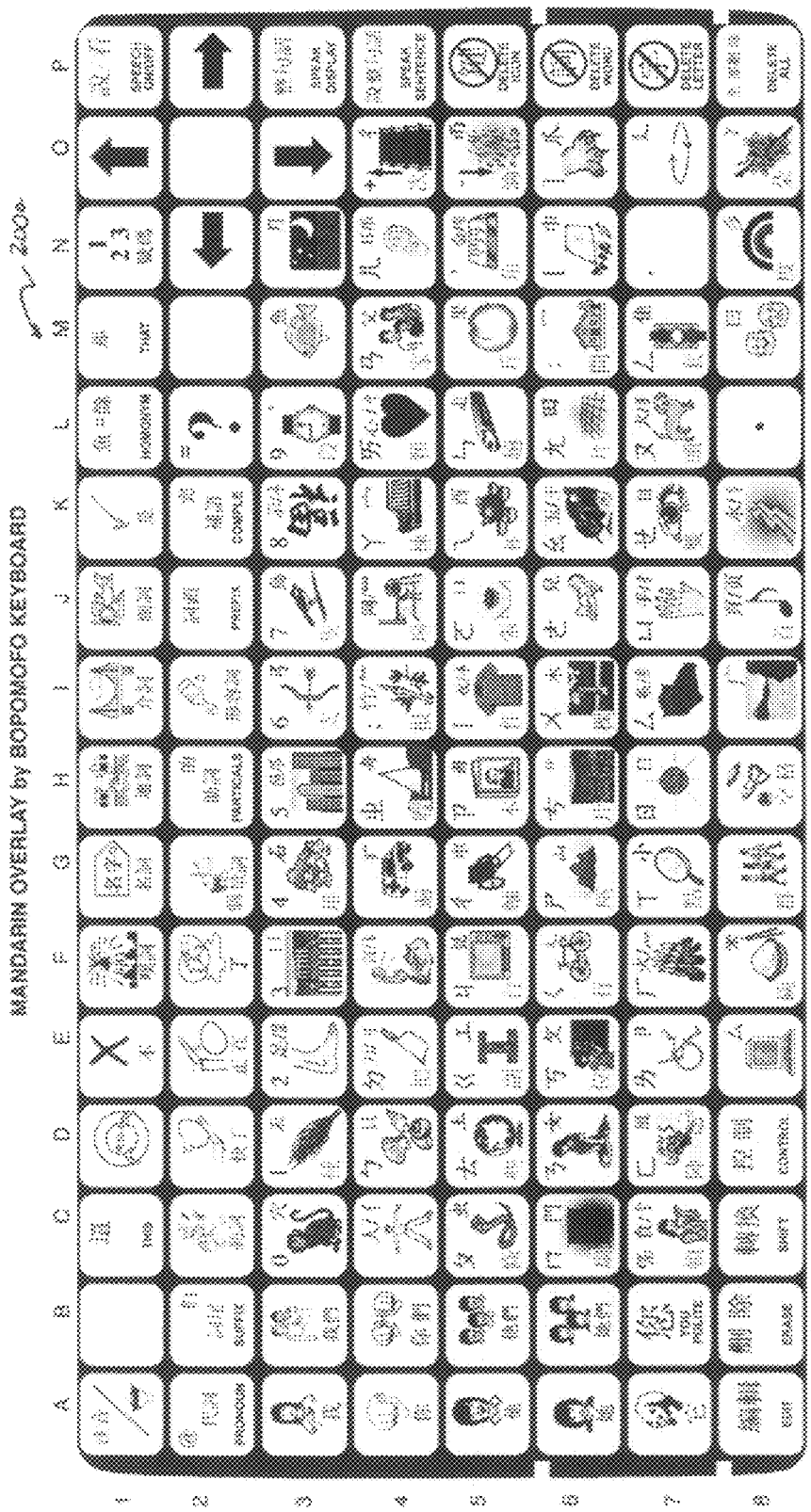
FIG. 5 illustrates a keyboard of a second example embodiment of the present application.

In a second embodiment of the present application, the apparatus 8 can include a keyboard 200, wherein a plurality of the keys include each of a polysemous symbol, a Chinese radical, and a Bopomofo letter (instead of Pinyin letters), and also optionally measure words as well. Such a keyboard 200a is shown in FIG. 5 for example, and works in the same manner as keyboard 200 expressed above, and in the same manner in conjunction with apparatus 8 and all components previously discussed in FIGS. 3 and 3a. Further, the apparatus 8 may include a memory 6, to store the plurality of symbol sequences, each in association with at least one Chinese character, and may operate in a mode switching manner similar to that discussed with Pinyin letters expressed above. The processor 4 is then further adapted to receive both an associated Bopomofo character and an associated symbol in response to selection of a key including both an associated Bopomofo character and an associated symbol, to compare a sequence of selected symbols to the stored plurality of symbol sequences, and to output Bopomofo characters associated with selected keys upon determining that selected symbols of selected keys do not correspond to any of the stored symbol sequences.

FIG. 6 is thus equivalent to FIG. 4a explained above, with the exception that instead of a Pinyin letter (left upper corner of keys), there is a Bopomofo symbol in the left upper corner of the key (in the example of FIG. 6, the Bopomofo symbol for the sound "ch" is shown). The associated Chinese radical is the same Chinese radical discussed previously in the Pinyin first embodiment, only in traditional script. Note that the Chinese radicals are generally classified as traditional or simplified. Taiwan uses the traditional script, which is a little more "fancy" than the simplified one, which is mostly used in mainland China (noting that old books are all written using traditional radicals; while simplified radicals are only used since the last century). Some measure words are also only transformed into traditional script, for example vehicles (on wheels). Thus, in various embodiments of the present application, the Chinese radical is at least one of a simplified Chinese radical and a traditional Chinese radical.

As operation of the keyboard 200a of FIG. 5, the system 8 of FIGS. 3 and 3a and method are the same as that described above for the Pinyin embodiment, further explanation will be omitted for the sake of brevity.

The apparatuses discussed above can be implemented in the form of a method. For example, in one embodiment the method may include receiving an indication of selection of a plurality of polysemous symbols, each relating to a concept represented by a Chinese radical; determining whether or not the plurality of selected symbols correspond to a sequence of symbols associated with at least one Chinese character; and outputting, in response to determining that the plurality of selected symbols correspond to a sequence of symbols associated with at least one Chinese character, the at least one Chinese character. The method may include storing, in a database, the plurality of symbol sequences, each associated with at least one Chinese character. In the method, the outputting may include displaying the at least one Chinese character associated with the sequence of selected symbols, and the receiving may include receiving an indication of selection of a plurality of keys of a keyboard, a plurality of the keys including at least a polysemous symbol and an associated Chinese radical. A plurality of the keys include each of a polysemous symbol, a Chinese radical, a Chinese measure word character and a Pinyin/Bopomofo letter, each associated with one another.

In another embodiment, the method may include receiving an indication of selection of a plurality of keys, each being associated with at least two polysemous symbols; determining whether or not one symbol, of the two polysemous symbols associated with each selected key, when sequenced for each of the selected keys, correspond to a sequence of symbols associated with at least one Chinese character; and outputting, in response to determining that the plurality of selected keys include a sequence of symbols associated with at least one Chinese character, the at least one Chinese character. The at least two polysemous symbols may include at least one Chinese radical and/or at least one pictorial illustration. The method may include storing, in a database, the plurality of symbol sequences, each associated with at least one Chinese character. In the method, the outputting may include displaying the at least one Chinese character associated with the sequence of selected symbols, and the receiving may include receiving an indication of selection of a plurality of keys of a keyboard, a plurality of the keys including at least a polysemous symbol and an associated Chinese radical. A plurality of the keys include each of a polysemous symbol, a Chinese radical, a Chinese measure word character and a Pinyin/Bopomofo letter, each associated with one another.

The methods of at least one embodiment expressed above may be implemented as a computer data signal embodied in the carrier wave or propagated signal that represents a sequence of instructions which, when executed by a processor causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to implement any one of the aforementioned methods when run on a computer device (including a processor 4, for example). Thus, the storage medium or computer readable medium, is adapted to store information and is adapted to interact with a data processing facility or computer device to perform the method of any of the above mentioned embodiments.

In at least one embodiment, a computer readable medium, for use in conjunction with a computer, includes a first code segment for causing the computer to receive selection of a plurality of polysemous symbols, each relating to a concept represented by a Chinese radical; a second code segment for causing the computer to determine whether or not the plurality of selected symbols correspond to a sequence of symbols associated with at least one Chinese character; and a third code segment for causing the computer to output, in response to determining that the plurality of selected symbols correspond to a sequence of symbols associated with at least one Chinese character, the at least one Chinese character. A fourth code segment may be included for storing, in a database, the plurality of symbol sequences, each associated with at least one Chinese character.

The computer readable or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the apparatus can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBOL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with an apparatus.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An apparatus, comprising:
a keyboard including keys, a plurality of the keys each being associated with a polysemous symbol, the polysemous symbols including pictorial illustrations wherein each of the respective pictorial illustrations is displayed with a Chinese radical in association with a respective one of the plurality of keys and relates to a concept represented by the respective Chinese radical; and
a processor, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character.

2. The apparatus of claim 1, further comprising:
a memory, to store the plurality of symbol sequences, each in association with at least one Chinese character.

3. The apparatus of claim 2, wherein the memory is used to store the plurality of symbol sequences in a database, each stored in association with at least one Chinese character.

4. The apparatus of claim 2, wherein the output includes a speech synthesized output of the associated at least one Chinese character for each selected symbol sequence.

5. The apparatus of claim 2, wherein each stored symbol sequence includes at least three symbols.

6. The apparatus of claim 2, wherein each stored symbol sequence includes at least two symbols.

7. The apparatus of claim 1, further comprising:
a display to display the output at least one Chinese character associated with the sequence of selected symbols.

8. The apparatus of claim 7, wherein the keyboard is a virtual keyboard.

9. The apparatus of claim 8, wherein the keyboard and display are integrated.

10. The apparatus of claim 1, wherein the keyboard is a virtual keyboard.

11. The apparatus of claim 1, wherein a plurality of the keys include each of a polysemous symbol, a Chinese radical and a Pinyin letter.

12. The apparatus of claim 11, further comprising:
a memory, to store the plurality of symbol sequences, each in association with at least one Chinese character,
wherein the processor is further adapted to receive both an associated Pinyin letter and an associated symbol in response to selection of a key including both an associated Pinyin letter and an associated symbol, to compare a sequence of selected symbols to the stored plurality of symbol sequences, and to output Pinyin letters associated with selected keys upon determining that selected symbols of selected keys do not correspond to any of the stored symbol sequences.

13. The apparatus of claim 11, wherein at least some of the symbols are arranged on the keyboard such that a key corresponding to an initial letter of a name of a symbol, in Pinyin, corresponds to a key including a Roman letter on an international keyboard layout.

14. The apparatus of claim 1, wherein a plurality keys include each of a polysemous symbol, a Chinese radical and a Bopomofo letter.

15. The apparatus of claim 14, further comprising:
a memory, to store the plurality of symbol sequences, each in association with at least one Chinese character,
wherein the processor is further adapted to receive both an associated Bopomofo character and an associated symbol in response to selection of a key including both an associated Bopomofo character and an associated symbol, to compare a sequence of selected symbols to the stored plurality of symbol sequences, and to output Bopomofo characters associated with selected keys upon determining that selected symbols of selected keys do not correspond to any of the stored symbol sequences.

16. The apparatus of claim 14, wherein at least some of the symbols are arranged on the keyboard such that a key corresponding to an initial letter of a name of a symbol, in Bopomofo, corresponds to a key including a Roman letter on an international keyboard layout.

17. The apparatus of claim 1, wherein a plurality of the keys include each of a polysemous symbol, a Chinese radical, a Chinese measure word character and a Pinyin letter, each associated with one another.

18. The apparatus of claim 17, wherein the output includes output of an associated measure word.

19. The apparatus of claim 1, wherein a plurality keys include each of a polysemous symbol, a Chinese radical, a Chinese measure word character and a Bopomofo letter, each associated with one another.

20. The apparatus of claim 19, wherein the output includes output of an associated measure word.

21. The apparatus of claim 1, wherein the output includes a speech synthesized output of the associated at least one Chinese character for each selected symbol sequence.

22. The apparatus of claim 1, wherein the Chinese radical is at least one of a simplified Chinese radical and a traditional Chinese radical.

23. A speech synthesis system including the apparatus of claim 1; and a speech synthesizer to synthesize the output at least one Chinese character.

24. A scanning system including the apparatus of claim 1; and a row-column scanner to select a key.

25. A phono-spell system including the apparatus of claim 1.

26. The apparatus of claim 1, wherein the plurality of keys associated with a polysemous symbol relating to a concept represented by a Chinese radical are less than a total number of existing Chinese radicals.

27. The apparatus of claim 26, wherein the plurality of keys associated with a polysemous symbol relating to a concept represented by a Chinese radical are less than half of the total number of Chinese radicals.

28. The apparatus of claim 26, wherein the plurality of keys associated with a polysemous symbol relating to a concept represented by a Chinese radical are less than 40% of the total number of Chinese radicals.

29. The apparatus of claim 26, wherein the plurality of keys associated with a polysemous symbol relating to a concept represented by a Chinese radical are less than 30% of the total number of Chinese radicals.

30. The apparatus of claim 1, wherein the pictorial illustrations are associated with a Chinese radical.

31. A method, comprising:
receiving an indication of selection of a plurality of polysemous symbols, the polysemous symbols including pictorial illustrations, wherein each of the respective pictorial illustrations is displayed with a Chinese radical in association with a respective one of the plurality of keys and relates to a concept represented by the respective Chinese radical;
determining whether or not the plurality of selected symbols correspond to a sequence of symbols associated with at least one Chinese character; and
outputting, in response to determining that the plurality of selected symbols correspond to a sequence of symbols associated with at least one Chinese character, the at least one Chinese character.

32. The method of claim 31, further comprising:
storing, in a database, the plurality of symbol sequences, each associated with at least one Chinese character.

33. The method of claim 32, wherein the output includes a speech synthesized output of the associated at least one Chinese character for each selected symbol sequence.

34. The method of claim 32, wherein each stored symbol sequence includes at least three symbols.

35. The method of claim 32, wherein each stored symbol sequence includes at least two symbols.

36. The method of claim 31, wherein the outputting includes displaying the at least one Chinese character associated with the sequence of selected symbols.

37. The method of claim 31, wherein the receiving includes receiving an indication of selection of a plurality of keys of a keyboard, a plurality of the keys including at least a polysemous symbol and an associated Chinese radical.

38. The method of claim 37, wherein a plurality keys include each of a polysemous symbol, a Chinese radical and a Pinyin letter.

39. The method of claim 38, further comprising:
storing the plurality of symbol sequences, each in association with at least one Chinese character,
wherein both an associated Pinyin letter and an associated symbol are received in response to selection of a key including both an associated Pinyin letter and an associated symbol, the determining including comparing a sequence of selected symbols to the stored plurality of symbol sequences, Pinyin letters associated with selected keys being output upon determining that selected symbols of selected keys dc not correspond to any of the stored symbol sequences.

40. The method of claim 34, wherein at least some of the symbols are arranged on the keyboard such that a key corresponding to an initial letter of a name of a symbol, in Pinyin, corresponds to a key including a Roman letter on an international keyboard layout.

41. The method of claim 37, wherein a plurality keys include each of a polysemous symbol, a Chinese radical and a Bopomofo letter.

42. The method of claim 41, further comprising:
storing the plurality of symbol sequences, each in association with at least one Chinese character,
wherein both an associated Bopomofo character and an associated symbol are received in response to selection of a key including both an associated Bopomofo character and an associated symbol, the determining including comparing a sequence of selected symbols to the stored plurality of symbol sequences, Bopomofo characters associated with selected keys being output upon determining that selected symbols of selected keys do not correspond to any of the stored symbol sequences.

43. The method of claim 41, wherein at least some of the symbols are arranged on the keyboard such that a key corresponding to an initial letter of a name of a symbol, in Bopomofo, corresponds to a key including a Roman letter on an international keyboard layout.

44. The method of claim 37, wherein a plurality of the keys include each of a polysemous symbol, a Chinese radical, a Chinese measure word character and a Pinyin letter, each associated with one another.

45. The method of claim 44, wherein the output includes output of an associated measure word.

46. The method of claim 37, wherein a plurality keys include each of a polysemous symbol, a Chinese radical, a Chinese measure word character and a Bopomofo letter, each associated with one another.

47. The method of claim 46, wherein the output includes output of an associated measure word.

48. The method of claim 31, wherein the output includes a speech synthesized output of the associated at least one Chinese character for each selected symbol sequence.

49. The method of claim 31, wherein the Chinese radical is at least one of a simplified Chinese radical and a traditional Chinese radical.

50. The method of claim 31, further comprising synthesizing the output at least one Chinese character into speech.

51. The method of claim 31, further comprising using a row-column scanner to select a key.

52. The method of claim 31, further comprising using a phono-spell system.

53. The method of claim 31, wherein the plurality of keys associated with a polysemous symbol relating to a concept represented by a Chinese radical are less than a total number of existing Chinese radicals.

54. The method of claim 53, wherein the plurality of keys associated with a polysemous symbol relating to a concept represented by a Chinese radical are less than half of the total number of Chinese radicals.

55. The method of claim 53, wherein the plurality of keys associated with a polysemous symbol relating to a concept represented by a Chinese radical are less than 40% of the total number of Chinese radicals.

56. The method of claim 53, wherein the plurality of keys associated with a polysemous symbol relating to a concept represented by a Chinese radical are less than 30% of the total number of Chinese radicals.

57. The method of claim 31, wherein the pictorial illustrations are associated with a Chinese radical.

58. A non-transitory computer readable medium, for use in conjunction with a computer, comprising:
a first code segment for causing the computer to receive selection of a plurality of polysemous symbols, the polysemous symbols including pictorial illustrations, wherein each of the respective pictorial illustrations is displayed with a Chinese radical in association with a respective one of the plurality of keys and relates to a concept represented by the respective Chinese radical;
a second code segment for causing the computer to determine whether or not the plurality of selected symbols correspond to a sequence of symbols associated with at least one Chinese character; and
a third code segment for causing the computer to output, in response to determining that the plurality of selected symbols correspond to a sequence of symbols associated with at least one Chinese character, the at least one Chinese character.

59. The non-transitory computer readable medium of claim 58, further comprising:
   a fourth code segment for storing, in a database, the plurality of symbol sequences, each associated with at least one Chinese character.

60. The non-transitory computer readable medium of claim 59, wherein each stored symbol sequence includes at least three symbols.

61. The non-transitory computer readable medium of claim 59, wherein each stored symbol sequence includes at least two symbols.

62. The non-transitory computer readable medium of claim 58, wherein the third code segment for outputting includes displaying the at least one Chinese character associated with the sequence of selected symbols.

63. The non-transitory computer readable medium of claim 58, wherein the first code segment for causing the computer to receive includes causing the computer to receive an indication of selection of a plurality of keys of a keyboard, a plurality of the keys including at least a polysemous symbol and an associated Chinese radical.

64. The non-transitory computer readable medium of claim 63, wherein a plurality keys include each of a polysemous symbol, a Chinese radical and a Pinyin letter.

65. The non-transitory computer readable medium of claim 64, further comprising:
   a fourth code segment for causing to computer to store the plurality of symbol sequences, each in association with at least one Chinese character,
   wherein both an associated Pinyin letter and an associated symbol are received in response to selection of a key including both an associated Pinyin letter and an associated symbol, the determining including comparing a sequence of selected symbols to the stored plurality of symbol sequences, Pinyin letters associated with selected keys being output upon determining that selected symbols of selected keys do not correspond to any of the stored symbol sequences.

66. The non-transitory computer readable medium of claim 64, wherein at least some of the symbols are arranged on the keyboard such that a key corresponding to an initial letter of a name of a symbol, in Pinyin, corresponds to a key including a Roman letter on an international keyboard layout.

67. The non-transitory computer readable medium of claim 63, wherein a plurality keys include each of a polysemous symbol, a Chinese radical and a Bopomofo letter.

68. The non-transitory computer readable medium of claim 67, further comprising:
   a fourth code segment for causing the computer to store the plurality of symbol sequences, each in association with at least one Chinese character,
   wherein both an associated Bopomofo character and an associated symbol are received in response to selection of a key including both an associated Bopomofo character and an associated symbol, the determining including comparing a sequence of selected symbols to the stored plurality of symbol sequences, Bopomofo characters associated with selected keys being output upon determining that selected symbols of selected keys do not correspond to any of the stored symbol sequences.

69. The non-transitory computer readable medium of claim 67, wherein at least some of the symbols are arranged on the keyboard such that a key corresponding to an initial letter of a name of a symbol, in Bopomofo, corresponds to a key including a Roman letter on an international keyboard layout.

70. The non-transitory computer readable medium of claim 63, wherein a plurality of the keys include each of a polysemous symbol, a Chinese radical, a Chinese measure word character and a Pinyin letter, each associated with one another.

71. The non-transitory computer readable medium of claim 70, wherein the output includes output of an associated measure word.

72. The non-transitory computer readable medium of claim 63, wherein a plurality keys include each of a polysemous symbol, a Chinese radical, a Chinese measure word character and a Bopomofo letter, each associated with one another.

73. The non-transitory computer readable medium of claim 72, wherein the output includes output of an associated measure word.

74. The non-transitory computer readable medium of claim 58, wherein the output includes a speech synthesized output of the associated at least one Chinese character for each selected symbol sequence.

75. The non-transitory computer readable medium of claim 59, wherein the output includes a speech synthesized output of the associated at least one Chinese character for each selected symbol sequence.

76. The non-transitory computer readable medium of claim 58, wherein the Chinese radical is at least one of a simplified Chinese radical and a traditional Chinese radical.

77. The non-transitory computer readable medium of claim 58, further comprising a fourth code segment for causing the computer to synthesize the output at least one Chinese character into speech.

78. The non-transitory computer readable medium of claim 58, further comprising a fourth code segment for causing the computer to use a row-column scanner to select a key.

79. The non-transitory computer readable medium of claim 58, further comprising a code segment for using a phono-spell system.

80. The non-transitory computer readable medium of claim 58, wherein the plurality of keys associated with a polysemous symbol relating to a concept represented by a Chinese radical are less than a total number of existing Chinese radicals.

81. The non-transitory computer readable medium of claim 80, wherein the plurality of keys associated with a polysemous symbol relating to a concept represented by a Chinese radical are less than half of the total number of Chinese radicals.

82. The non-transitory computer readable medium of claim 80, wherein the plurality of keys associated with a polysemous symbol relating to a concept represented by a Chinese radical are less than 40% of the total number of Chinese radicals.

83. The non-transitory computer readable medium of claim 80, wherein the plurality of keys associated with a polysemous symbol relating to a concept represented by a Chinese radical are less than 30% of the total number of Chinese radicals.

84. The non-transitory computer readable medium of claim 58, wherein the pictorial illustrations are associated with a Chinese radical.

85. An apparatus, comprising:
   means for receiving an indication of selection of a plurality of polysemous symbols, the polysemous symbols including pictorial illustrations, wherein each of the respective pictorial illustrations is displayed with a Chinese radical in association with a respective one of the plurality of keys and relates to a concept represented by the respective Chinese radical;

means for determining whether or not the plurality of selected symbols correspond to a sequence of symbols associated with at least one Chinese character; and means for outputting, in response to determining that the plurality of selected symbols correspond to a sequence of symbols associated with at least one Chinese character, the at least one Chinese character.

86. The apparatus of claim 85, further comprising:
means for storing, in a database, the plurality of symbol sequences, each associated with at least one Chinese character.

87. The apparatus of claim 86, wherein the output includes a speech synthesized output of the associated at least one Chinese character for each selected symbol sequence.

88. The apparatus of claim 86, wherein each stored symbol sequence includes at least three symbols.

89. The apparatus of claim 86, wherein each stored symbol sequence includes at least two symbols.

90. The apparatus of claim 85, wherein the outputting includes displaying the at least one Chinese character associated with the sequence of selected symbols.

91. The apparatus of claim 85, wherein the receiving includes receiving an indication of selection of a plurality of keys of a keyboard, a plurality of the keys including at least a polysemous symbol and an associated Chinese radical.

92. The apparatus of claim 91, wherein a plurality keys include each of a polysemous symbol, a Chinese radical and a Pinyin letter.

93. The apparatus of claim 92, further comprising:
means for storing the plurality of symbol sequences, each in association with at least one Chinese character,
wherein both an associated Pinyin letter and an associated symbol are received in response to selection of a key including both an associated Pinyin letter and an associated symbol, the determining including comparing a sequence of selected symbols to the stored plurality of symbol sequences, Pinyin letters associated with selected keys being output upon determining that selected symbols of selected keys do not correspond to any of the stored symbol sequences.

94. The apparatus of claim 92, wherein at least some of the symbols are arranged on the keyboard such that a key corresponding to an initial letter of a name of a symbol, in Pinyin, corresponds to a key including a Roman letter on an international keyboard layout.

95. The apparatus of claim 91, wherein a plurality keys include each of a polysemous symbol, a Chinese radical and a Bopomofo letter.

96. The apparatus of claim 95, further comprising:
means for storing the plurality of symbol sequences, each in association with at least one Chinese character,
wherein both an associated Bopomofo character and an associated symbol are received in response to selection of a key including both an associated Bopomofo character and an associated symbol, the determining including comparing a sequence of selected symbols to the stored plurality of symbol sequences, Bopomofo characters associated with selected keys being output upon determining that selected symbols of selected keys do not correspond to any of the stored symbol sequences.

97. The apparatus of claim 95, wherein at least some of the symbols are arranged on the keyboard such that a key corresponding to an initial letter of a name of a symbol, in Bopomofo, corresponds to a key including a Roman letter on an international keyboard layout.

98. The apparatus of claim 91, wherein a plurality of the keys include each of a polysemous symbol, a Chinese radical, a Chinese measure word character and a Pinyin letter, each associated with one another.

99. The apparatus of claim 98, wherein the output includes output of an associated measure word.

100. The apparatus of claim 91, wherein a plurality keys include each of a polysemous symbol, a Chinese radical, a Chinese measure word character and a Bopomofo letter, each associated with one another.

101. The apparatus of claim 100, wherein the output includes output of an associated measure word.

102. The apparatus of claim 85, wherein the pictorial illustrations are associated with a Chinese radical.

103. The apparatus of claim 85, wherein the output includes a speech synthesized output of the associated at least one Chinese character for each selected symbol sequence.

104. The apparatus of claim 85, wherein the Chinese radical is at least one of a simplified Chinese radical and a traditional Chinese radical.

105. The apparatus of claim 85, further comprising means for synthesizing the output at least one Chinese character into speech.

106. The apparatus of claim 85, further comprising means for row-column scanning to select a key.

107. The apparatus of claim 85, further comprising a phono-spell system including the apparatus of claim 31.

108. The apparatus of claim 85, wherein the plurality of keys associated with a polysemous symbol relating to a concept represented by a Chinese radical are less than a total number of existing Chinese radicals.

109. The apparatus of claim 108, wherein the plurality of keys associated with a polysemous symbol relating to a concept represented by a Chinese radical are less than half of the total number of Chinese radicals.

110. The apparatus of claim 108, wherein the plurality of keys associated with a polysemous symbol relating to a concept represented by a Chinese radical are less than 40% of the total number of Chinese radicals.

111. The apparatus of claim 108, wherein the plurality of keys associated with a polysemous symbol relating to a concept represented by a Chinese radical are less than 30% of the total number of Chinese radicals.

112. An apparatus, comprising:
a keyboard including keys, a plurality of the keys each being associated with at least two polysemous symbols, the polysemous symbols including pictorial illustrations, wherein each of the respective pictorial illustrations is displayed with a Chinese radical in association with a respective one of the plurality of keys and relates to a concept represented by the respective Chinese radical; and
a processor, to determine whether or not a plurality of symbols, associated with a plurality of selected keys, form a sequence of symbols associated with at least one Chinese character, and, in response to determining that the plurality of selected symbols form a sequence of symbols associated with at least one Chinese character, to instruct output of the at least one Chinese character.

113. The apparatus of claim 112, wherein the at least two polysemous symbols include at least one Chinese radical.

114. The apparatus of claim 113, wherein the Chinese radical is at least one of a simplified Chinese radical and a traditional Chinese radical.

115. The apparatus of claim 113, wherein the plurality of keys associated with a polysemous symbol relating to a concept represented by a Chinese radical are less than a total number of existing Chinese radicals.

116. The apparatus of claim 115, wherein the plurality of keys associated with a polysemous symbol relating to a concept represented by a Chinese radical are less than half of the total number of Chinese radicals.

117. The apparatus of claim 115, wherein the plurality of keys associated with a polysemous symbol relating to a concept represented by a Chinese radical are less than 40% of the total number of Chinese radicals.

118. The apparatus of claim 115, wherein the plurality of keys associated with a polysemous symbol relating to a concept represented by a Chinese radical are less than 30% of the total number of Chinese radicals.

119. The apparatus of claim 112, further comprising:
a memory, to store the plurality of symbol sequences, each in association with at least one Chinese character.

120. The apparatus of claim 119, wherein the memory is used to store the plurality of symbol sequences in a database, each stored in association with at least one Chinese character.

121. The apparatus of claim 119, wherein the output includes a speech synthesized output of the associated at least one Chinese character for each selected symbol sequence.

122. The apparatus of claim 119, wherein each stored symbol sequence includes at least three symbols.

123. The apparatus of claim 119, wherein each stored symbol sequence includes at least two symbols.

124. The apparatus of claim 112, further comprising:
a display to display the output at least one Chinese character associated with the sequence of selected symbols.

125. The apparatus of claim 124, wherein the keyboard is a virtual keyboard.

126. The apparatus of claim 125, wherein the keyboard and display are integrated.

127. The apparatus of claim 112, wherein the keyboard is a virtual keyboard.

128. The apparatus of claim 112, wherein a plurality of the keys include each of a polysemous symbol, a Chinese radical and a Pinyin letter.

129. The apparatus of claim 128, further comprising:
a memory, to store the plurality of symbol sequences, each in association with at least one Chinese character,
wherein the processor is further adapted to receive both an associated Pinyin letter and an associated symbol in response to selection of a key including both an associated Pinyin letter and an associated symbol, to compare a sequence of selected symbols to the stored plurality of symbol sequences, and to output Pinyin letters associated with selected keys upon determining that selected symbols of selected keys do not correspond to any of the stored symbol sequences.

130. The apparatus of claim 129, further comprising:
a memory, to store the plurality of symbol sequences, each in association with at least one Chinese character,
wherein the processor is further adapted to receive both an associated Bopomofo character and an associated symbol in response to selection of a key including both an associated Bopomofo character and an associated symbol, to compare a sequence of selected symbols to the stored plurality of symbol sequences, and to output Bopomofo characters associated with selected keys upon determining that selected symbols of selected keys do not correspond to any of the stored symbol sequences.

131. The apparatus of claim 128, wherein at least some of the symbols are arranged on the keyboard such that a key corresponding to an initial letter of a name of a symbol, in Pinyin, corresponds to a key including a Roman letter on an international keyboard layout.

132. The apparatus of claim 112, wherein a plurality keys include each of a polysemous symbol, a Chinese radical and a Bopomofo letter.

133. The apparatus of claim 132, wherein at least some of the symbols are arranged on the keyboard such that a key corresponding to an initial letter of a name of a symbol, in Bopomofo, corresponds to a key including a Roman letter on an international keyboard layout.

134. The apparatus of claim 112, wherein a plurality of the keys include each of a polysemous symbol, a Chinese radical, a Chinese measure word character and a Pinyin letter, each associated with one another.

135. The apparatus of claim 134, wherein the output includes output of an associated measure word.

136. The apparatus of claim 112, wherein a plurality keys include each of a polysemous symbol, a Chinese radical, a Chinese measure word character and a Bopomofo letter, each associated with one another.

137. The apparatus of claim 136, wherein the output includes output of an associated measure word.

138. The apparatus of claim 112, wherein the output includes a speech synthesized output of the associated at least one Chinese character for each selected symbol sequence.

139. A speech synthesis system including the apparatus of claim 112; and a speech synthesizer to synthesize the output at least one Chinese character.

140. A scanning system including the apparatus of claim 112; and a row-column scanner to select a key.

141. A phono-spell system including the apparatus of claim 112.

142. The apparatus of claim 112, wherein the pictorial illustrations are associated with a Chinese radical.

143. A method, comprising:
receiving an indication of selection of a plurality of keys, each being associated with at least two polysemous symbols, the polysemous symbols including pictorial illustrations, wherein each of the respective pictorial illustrations is displayed with a Chinese radical in association with a respective one of the plurality of keys and relates to a concept represented by the respective Chinese radical;
determining whether or not one symbol, of the two polysemous symbols associated with each selected key, when sequenced for each of the selected keys, correspond to a sequence of symbols associated with at least one Chinese character; and
outputting, in response to determining that the plurality of selected keys include a sequence of symbols associated with at least one Chinese character, the at least one Chinese character.

144. The method of claim 143, wherein the at least two polysemous symbols include at least one Chinese radical.

145. The method of claim 144, wherein the output includes a speech synthesized output of the associated at least one Chinese character for each selected symbol sequence.

146. The method of claim 144, wherein the Chinese radical is at least one of a simplified Chinese radical and a traditional Chinese radical.

147. The method of claim 143, further comprising:
storing, in a database, the plurality of symbol sequences, each associated with at least one Chinese character.

148. The method of claim 143, wherein at least one of the outputting includes displaying the at least one Chinese character associated with the sequence of selected symbols and the receiving includes receiving an indication of selection of a plurality of keys of a keyboard, a plurality of the keys including at least a polysemous symbol and an associated Chinese radical.

149. The method of claim 148, wherein a plurality keys include each of a polysemous symbol, a Chinese radical and a Pinyin letter.

150. The method of claim 149, further comprising:
storing the plurality of symbol sequences, each in association with at least one Chinese character,
wherein both an associated Pinyin letter and an associated symbol are received in response to selection of a key including both an associated Pinyin letter and an associated symbol, the determining including comparing a sequence of selected symbols to the stored plurality of symbol sequences, Pinyin letters associated with selected keys being output upon determining that selected symbols of selected keys do not correspond to any of the stored symbol sequences.

151. The method of claim 149, wherein at least some of the symbols are arranged on the keyboard such that a key corresponding to an initial letter of a name of a symbol, in Pinyin, corresponds to a key including a Roman letter on an international keyboard layout.

152. The method of claim 148, wherein a plurality keys include each of a polysemous symbol, a Chinese radical and a Bopomofo letter.

153. The method of claim 152, further comprising:
storing the plurality of symbol sequences, each in association with at least one Chinese character,
wherein both an associated Bopomofo character and an associated symbol are received in response to selection of a key including both an associated Bopomofo character and an associated symbol, the determining including comparing a sequence of selected symbols to the stored plurality of symbol sequences, Bopomofo characters associated with selected keys being output upon determining that selected symbols of selected keys do not correspond to any of the stored symbol sequences.

154. The method of claim 152, wherein at least some of the symbols are arranged on the keyboard such that a key corresponding to an initial letter of a name of a symbol, in Bopomofo, corresponds to a key including a Roman letter on an international keyboard layout.

155. The method of claim 148, wherein a plurality of the keys include each of a polysemous symbol, a Chinese radical, a Chinese measure word character and a Pinyin letter, each associated with one another.

156. The method of claim 155, wherein the output includes output of an associated measure word.

157. The method of claim 148, wherein a plurality keys include each of a polysemous symbol, a Chinese radical, a Chinese measure word character and a Bopomofo letter, each associated with one another.

158. The method of claim 157, wherein the output includes output of an associated measure word.

159. The method of claim 143, wherein the output includes a speech synthesized output of the associated at least one Chinese character for each selected symbol sequence.

160. The method of claim 143, wherein each stored symbol sequence includes at least three symbols.

161. The method of claim 143, wherein each stored symbol sequence includes at least two symbols.

162. The method of claim 143, further comprising synthesizing the output at least one Chinese character into speech.

163. The method of claim 143, further comprising using a row-column scanner to select a key.

164. The method of claim 143, further comprising using a phono-spell system.

165. The method of claim 143, wherein the plurality of keys associated with a polysemous symbol relating to a concept represented by a Chinese radical are less than a total number of existing Chinese radicals.

166. The method of claim 165, wherein the plurality of keys associated with a polysemous symbol relating to a concept represented by a Chinese radical are less than half of the total number of Chinese radicals.

167. The method of claim 165, wherein the plurality of keys associated with a polysemous symbol relating to a concept represented by a Chinese radical are less than 40% of the total number of Chinese radicals.

168. The method of claim 165, wherein the plurality of keys associated with a polysemous symbol relating to a concept represented by a Chinese radical are less than 30% of the total number of Chinese radicals.

169. The method of claim 143, wherein the pictorial illustrations are associated with a Chinese radical.

170. A non-transitory computer readable medium including a program which, when executed on a computer device, is adapted to implement the method of claim 143.

* * * * *